US012570110B2

(12) United States Patent
Carpenter et al.

(10) Patent No.: US 12,570,110 B2
(45) Date of Patent: Mar. 10, 2026

(54) TIRE HEALTH MONITORING SYSTEMS AND METHODS THERETO

(71) Applicant: American Tire Distributors, Inc., Huntersville, NC (US)

(72) Inventors: Jeffrey D. Carpenter, Pasadena, CA (US); Mark E. Duttweiler, Sherman Oaks, CA (US); W. Daniel Hillis, Rindge, NH (US); James Wallace Sarrett, Sunland, CA (US); Bruce J. Walker, Concord, MA (US); David C. Douglas, Concord, MA (US)

(73) Assignee: American Tire Distributors, Inc., Huntersville, NC (US)

( * ) Notice: Subject to any disclaimer, the term of this patent is extended or adjusted under 35 U.S.C. 154(b) by 0 days.

(21) Appl. No.: 17/967,991

(22) Filed: Oct. 18, 2022

(65) Prior Publication Data

US 2023/0051104 A1 Feb. 16, 2023

Related U.S. Application Data

(63) Continuation of application No. 16/749,822, filed on Jan. 22, 2020, now Pat. No. 11,472,235.

(60) Provisional application No. 62/795,363, filed on Jan. 22, 2019.

(51) Int. Cl.
| | |
|---|---|
| *B60C 11/24* | (2006.01) |
| *B60C 11/00* | (2006.01) |
| *G01M 17/02* | (2006.01) |
| *G07C 5/00* | (2006.01) |

(52) U.S. Cl.
CPC ............ *B60C 11/246* (2013.01); *G07C 5/006* (2013.01); *B60C 2011/0033* (2013.01); *G01M 17/02* (2013.01)

(58) Field of Classification Search
CPC .......... B60C 11/246; B60C 2011/0333; G07C 5/006; G01M 17/02
See application file for complete search history.

(56) References Cited

U.S. PATENT DOCUMENTS

| | | | |
|---|---|---|---|
| 5,500,065 | A | 3/1996 | Koch et al. |
| 6,327,904 | B1 | 12/2001 | Oldenettel |
| 6,972,673 | B2 | 12/2005 | Yamagiwa et al. |

(Continued)

FOREIGN PATENT DOCUMENTS

DE 102014214465 A1 * 1/2016 ............. B60C 23/00

*Primary Examiner* — Kristina M Deherrera
*Assistant Examiner* — Jean F Morello
(74) *Attorney, Agent, or Firm* — TROUTMAN PEPPER LOCKE LLP; Christopher C. Close, Jr.; Stephanie J. Remy

(57) ABSTRACT

The disclosed technology includes a system comprising a tire-mounted inertial measurement unit (IMU). The IMU can be configured to measure linear acceleration data and angular velocity data associated with a tire, and the system can be configured to determine various indicators of tire health based on the linear acceleration data and angular velocity data. The system can be configured to determine a distance between the IMU and an outer rolling surface of the tire. The system can be configured to monitor changes in this distance over time, which can be indicative of tread wear over time. Accordingly, the system can be configured to monitor change in the tread depth over time such that the system is configured to monitor tread depth of the tire.

16 Claims, 11 Drawing Sheets

(56)  References Cited

U.S. PATENT DOCUMENTS

| | | | |
|---|---|---|---|
| 7,391,306 B2 | 6/2008 | Dufoumier | |
| 7,557,694 B1 | 7/2009 | Graham | |
| 7,630,805 B2 | 12/2009 | Lu et al. | |
| 8,631,681 B2 | 1/2014 | Lee | |
| 9,604,508 B2 | 3/2017 | Lesesky et al. | |
| 9,744,818 B2 | 8/2017 | Weston | |
| 10,000,100 B2 * | 6/2018 | Weston | B60C 23/064 |
| 10,399,393 B1 | 9/2019 | Trotta | |
| 2007/0240502 A1 | 10/2007 | Morinaga et al. | |
| 2010/0295669 A1 * | 11/2010 | Pannek | B60C 11/24 |
| | | | 73/146 |
| 2016/0009290 A1 * | 1/2016 | Benedict | B60C 23/0479 |
| | | | 701/34.4 |
| 2017/0113494 A1 | 4/2017 | Singh et al. | |
| 2018/0188025 A1 | 7/2018 | Cyllik et al. | |
| 2019/0084355 A1 | 3/2019 | McPillan et al. | |
| 2019/0143987 A1 * | 5/2019 | Sekizawa | G01K 13/00 |
| | | | 73/146 |

* cited by examiner

TIRE HEALTH MONITORING SYSTEMS AND METHODS THERETO

CROSS-REFERENCE TO RELATED APPLICATIONS

This application claims priority to and is a continuation of U.S. Non-Provisional patent application Ser. No. 16/749,822, filed Jan. 22, 2020, which claims priority to U.S. Provisional Patent Application No. 62/795,363, filed on Jan. 22, 2019, which is incorporated herein by reference in its entirety as if fully set forth below.

BACKGROUND

Driving on worn, low-tread, and low-pressure tires can create a safety hazard for the driver and passengers of a vehicle, as well as others who may encounter a vehicle traveling on worn, low-tread tires. For example, a vehicle traveling on worn, low-tread, and/or low-pressure tires may be unable to stop suddenly and efficiently while traveling on roads during inclement weather, such as rain, snow, ice, or mud. This can result in a collision involving the vehicle that could have been otherwise avoided, and such collisions can cause property damage and/or personal injury.

Tire treads are designed to maintain solid contact and grip on the road even during inclement weather. Driving on tires with insufficient treads (i.e., balding or low-tread tires) can provide an increased risk of hydroplaning and/or can result in decreased handling of the vehicle. Moreover, driving can create friction between tires and the road, and tire treads can function to help cool the tires, reducing the effects of the heat caused by driving. Low-tread tires can reduce the ability of the tire to cool, resulting in the heat experienced by the tires to reach unsafe levels. This can ultimately result in a blowout, which could cause a driver to lose control of a vehicle, especially while traveling at high speeds.

In addition, low-tread tires generally retain air less efficiently than tires with sufficient tread depth. Thus, low-tread tires can be more susceptible to becoming low-pressure tires. Improperly inflated tires are typically unable to properly grip the road, regardless of road conditions, making it more difficult for a driver to steer the vehicle. Improperly inflated tires can also cause a vehicle to skid during sudden stops, can reduce gas mileage of a vehicle, and/or can cause the tire tread to wear more quickly. As another example, low-tread tires can be more susceptible blowouts after suffering a puncture as the tire no longer have sufficient material to resist a blowout (e.g., resist shearing of the tire caused by the internal pressure of the tire) when the tire experiences a puncture.

Existing tires and related systems can include pressure sensors that can provide information regarding the pressure of the tire, but there is a need to track the tread depth of a tire, as well as other information that can be pertinent to the health of a tire.

SUMMARY

These and other problems can be addressed by the technology disclosed herein, which includes a system configured to monitor the health of a tire. The system can include an inertial measurement unit (IMU). The IMU can be adhered or attached within a tire and/or to a wheel (e.g., a hub) and can measure linear accelerations and angular velocities associated with the wheel. The system can analyze the data measured by the IMU to determine various measures of tire health. For example, the system can determine an estimated tread depth of the tire, as well as qualities associated with the contact patch, toe, and/or camber of the tire and/or corresponding wheel. The system can provide alerts to a computing device (e.g., a user's mobile device) indicating various qualities associated with the tire and/or vehicle, such as a measured use of the tire (e.g., service time, distance traveled), a determined health of the tire, and/or various measurements, metrics, or calculations associated with the tire.

The disclosed technology includes a tire monitoring system that can comprise a tire sensor mounted within a tire and a computing device in communication with the tire sensor. The computing device can be configured to receive kinematic sensor data from the tire sensor and determine a contact patch angle based at least in part on the kinematic sensor data. The kinematic sensor data can be indicative of motion of the tire, and the contact patch angle being an angle that represents a contact patch associated with the tire. The computing device can be configured to determine an estimated tread depth of the tire based at least in part on the contact patch angle and, responsive to determining that the estimated tread depth of the tire is a below a tread depth threshold, output instructions to a user device associated with the tire monitoring system. The instructions can instruct the user device to provide an indication for one or more suggested actions.

The tire sensor can be attached to an inner liner of the tire.

The tire sensor can be attached to a wheel hub associated with the tire.

The tire monitoring system can be configured such that determining the contact patch angle can include determining when the tire sensor enters the contact patch and when the tire sensor exits the contact patch.

The tire monitoring system can be configured such that (i) determining when the tire sensor enters the contact patch includes determining a first time or an entry angle associated with the tire sensor transitioning from an arc-like path to a cord-like path and (ii) determining when the tire sensor exits the contact patch comprises determining a second time or an exit angle associated with the tire sensor transitioning from the cord-like path to the arc-like path.

The tire monitoring system can be configured such that (i) determining when the tire sensor enters the contact patch comprises determining a first time or an entry angle associated with the kinematic sensor data passing a first kinematic data threshold and (ii) determining when the tire sensor exits the contact patch comprises determining a second time or an exit angle associated with the kinematic sensor data passing a second kinematic data threshold.

The computing device can be configured to receive tire data indicative of a model of the tire.

The one or more suggested actions can include instructions to rotate the tire with other tires of a vehicle associated with the tire, instructions to align the tire and the other tires, instructions to inflate the tire, and/or instructions to replace the tire.

The monitoring system of Claim 1, wherein the computing device is configured to determine the estimated tread depth only during periods in which the contact patch angle remains approximately constant during successive rotations of the tire.

The tire monitoring system can include a pressure sensor mounted inside the tire, and the pressure sensor can be configured to measure a pressure of the tire. The pressure sensor can be in communication with the computing device, and the computing device can be configured to receive, from the pressure sensor, pressure data that is indicative of the pressure of the tire and determine the estimated tread depth of the tire based at least in part on the contact patch angle and the pressure data.

The disclosed technology includes a method that can include receiving kinematic sensor data from a tire sensor, and the kinematic sensor data can be indicative of motion of a tire associated with the tire sensor. The method can include determining, based on the kinematic sensor data, a contact patch size associated with a contact patch of the tire and/or determining, based on the kinematic sensor data, a rotation rate of the tire. The method can include determining an estimated tread depth of the tire based at least in part on the contact patch size and/or the rotation rate and, responsive to determining that the estimated tread depth of the tire is a below a tread depth threshold, outputting instructions to a user device associated with the tire. The instructions can instruct the user device to provide an indication for one or more suggested actions.

Determining the contact patch size can include determining a contact patch angle that is indicative of an angular distance between entry of the tire sensor into the contact patch and exit of the tire sensor out of the contact patch. The angular distance can be calculated with respect to a center of the tire.

The method can include determining the estimated tread depth only during periods in which the contact patch angle remains approximately constant during successive rotations of the tire.

Determining the rotation rate of the tire can include calculating, based on the kinematic sensor data, a peak angular velocity and a mean angular velocity and calculating a peak tire rotation rate ratio by dividing the peak angular velocity by the mean angular velocity.

Calculating the peak angular velocity can include extracting a plurality of peak angular velocities for each of a plurality rotations of the tire and averaging the plurality of peak angular velocities, and calculating the mean angular velocity can include extracting a plurality of mean angular velocities for each of the plurality rotations of the tire and averaging the plurality of mean angular velocities.

The method can include receiving pressure data from pressure sensor and determining the estimated tread depth of the tire based at least in part on the contact patch size and the pressure data. The pressure data can be indicative of a pressure of the tire.

The disclosed technology includes a non-transitory, computer-readable medium storing instructions that, when executed by one or more processors, can cause a system to receive kinematic sensor data from a tire sensor. The kinematic sensor data can be indicative of motion of a tire associated with the tire sensor. The instructions, when executed by one or more processors, can cause the system to determine a rotation rate of the tire based on the kinematic sensor data, determine an estimated tread depth of the tire based at least in part on the rotation rate, and, responsive to determining that the estimated tread depth of the tire is a below a tread depth threshold, output instructions to a user device associated with the tire. The instructions can instruct the user device to provide an indication for one or more suggested actions.

Determining the rotation rate of the tire can include (i) calculating, based on the kinematic sensor data, a peak angular velocity and a mean angular velocity associated with the motion of the tire and (ii) calculate a peak tire rotation rate ratio by dividing the peak angular velocity by the mean angular velocity.

Calculating the peak angular velocity can include extracting a plurality of peak angular velocities for each of a plurality rotations of the tire and averaging the plurality of peak angular velocities, and calculating the mean angular velocity can include extracting a plurality of mean angular velocities for each of the plurality rotations of the tire and averaging the plurality of mean angular velocities.

Determining the contact patch size can include determining a contact patch angle based at least in part on when the tire sensor enters the contact patch and when the tire sensor exits the contact patch.

BRIEF DESCRIPTION OF THE FIGURES

Reference will now be made to the accompanying figures, which are not necessarily drawn to scale, and wherein.

DETAILED DESCRIPTION

Figure 1:
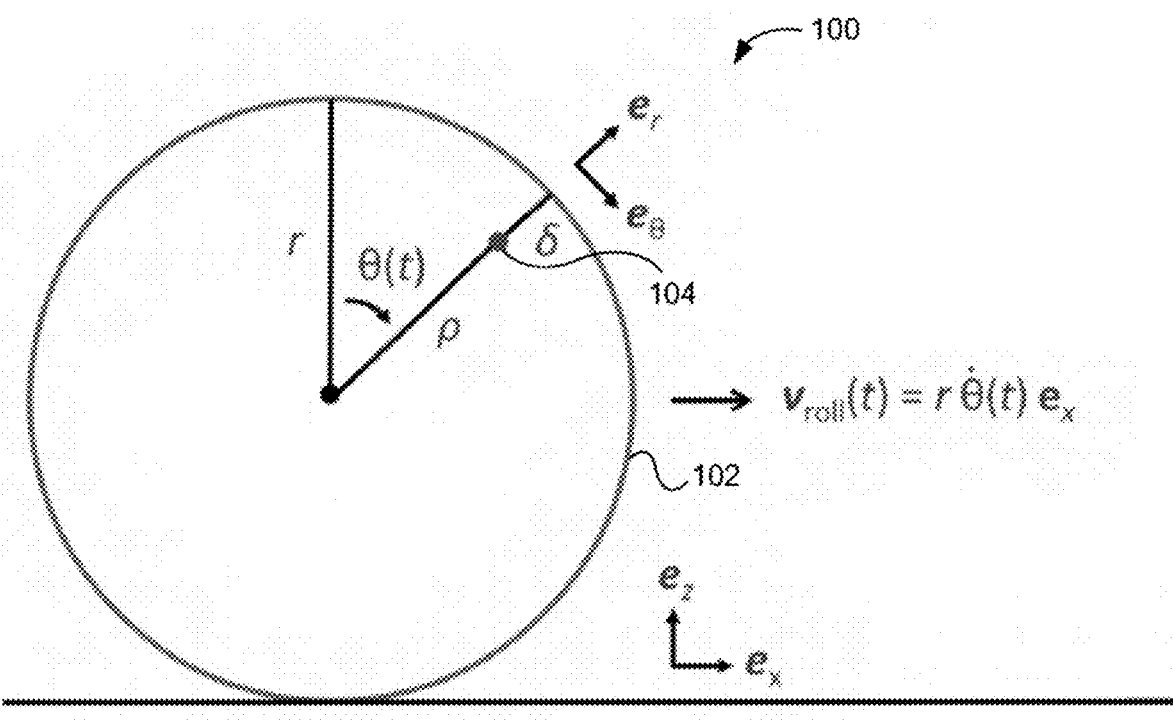
FIG. 1 illustrates a kinematic model of round and rigid tire, according to the disclosed technology.

Throughout this disclosure, the disclosed technology is described in relation to systems configured to monitor the health of a tire. But the disclosed technology is not so limited. For example, the disclosed technology can be effective in monitoring the health of multiple tires (e.g., all tires on a single vehicle or a fleet of vehicles), as well as providing alerts regarding when to rotate, adjust, and/or replace one or more tires.

The disclosed technology includes a system comprising a tire-mounted and/or wheel-mounted (e.g., mounted to the hub) inertial measurement unit (IMU), which can be configured to measure linear acceleration data and/or angular velocity data. The IMU can be configured to measure linear acceleration data and/or angular velocity data associated with the motion of a tire, and the system can be configured to determine various indicators of tire health based on the linear acceleration data and/or angular velocity data. The system can be configured to determine a rolling radius of the tire and/or a distance between the IMU radius of rotation and a rolling radius of the tire. The system can be configured to monitor changes in one or both of these distances over time, which can be indicative of tread wear over time. Accordingly, the system can be configured to monitor tread depth of a tire and/or monitor change in the tread depth over time. The system can be configured to provide alerts to a computing device, such as a user's mobile device, indicating a determined health of a tire, the measured use (e.g., service time, distance traveled) of a tire, as well as other metrics, and the system can also be configured to suggest actions to increase the overall safety and/or efficiency of a vehicle as it relates to a tire (e.g., rotate tires, align tires, inflate tires, replace tires). For example, the system can be configured to transmit one or more alerts to the user's mobile device or some other computing device.

Various aspects of the disclosed technology will be described more fully hereinafter with reference to the accompanying drawings. This disclosed technology can, however, be embodied in many different forms and should not be construed as limited to the embodiments set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

In the following description, numerous specific details are set forth. But it is to be understood that embodiments of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described can include a particular feature, structure, or characteristic, but not every embodiment necessarily includes the particular feature, structure, or characteristic. Further, repeated use of the phrase "in one embodiment" does not necessarily refer to the same embodiment, although it can.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

The disclosed technology relates to a system for monitoring the health of a tire. The system can include an IMU adhered (e.g., by tape, glue, epoxy, or something other adhesive) or otherwise attached within a tire and/or to a wheel. For example, the IMU can be adhered to the inner liner of a tire, the wheel rim, or the wheel hub. The IMU can be configured to detect and measure inertial data. The IMU can be configured to detect and measure linear accelerations and angular velocities associated with the tire in which the IMU is mounted. The system can be configured to determine, based at least in part on the linear acceleration data and the angular velocity data, changes in the distance between the IMU and the outer rolling surface. As will be appreciated, the difference in distance between the IMU and the outer rolling surface of the tire will decrease with tread wear (i.e., as the tread depth of the tire decreases). Accordingly, the system can be configured to monitor change in the tread depth over time. The system can be configured to measure other data, quantities, and aspects associated with the tire. Various aspects and functionalities of the disclosed technology are discussed more fully below.

FIG. 1 is a kinematic model of a system 100 including a theoretical, perfectly round tire 102 that rolls without slipping. The system 100 can include an IMU 104 mounted in the tire 102. The system 100 can include a computing device. Alternately or in addition, the computing device 200 can be separate from the system 100, and the system 100 can be configured to communicate with the computing device 200 (e.g., the IMU 104 can be configured to transmit detected data to an external computing device). As will be appreciated, the computing device 200 can refer to a computing device co-located with and/or integrated into the IMU 104, disposed on the vehicle to which the tire 102 is attached, a remote server or other computing device, a user device (e.g., a mobile phone, tablet, laptop), any other computing device capable of performing one or more of the functionalities disclosed herein, and/or any combination thereof. For example, any of the aforementioned computing devices can be configured to perform some or all calculations or processing associated with the disclosed technology or multiple of the aforementioned computing devices can be configured to cooperate perform at least some calculations in various divisions and orders of steps.

Figure 2:
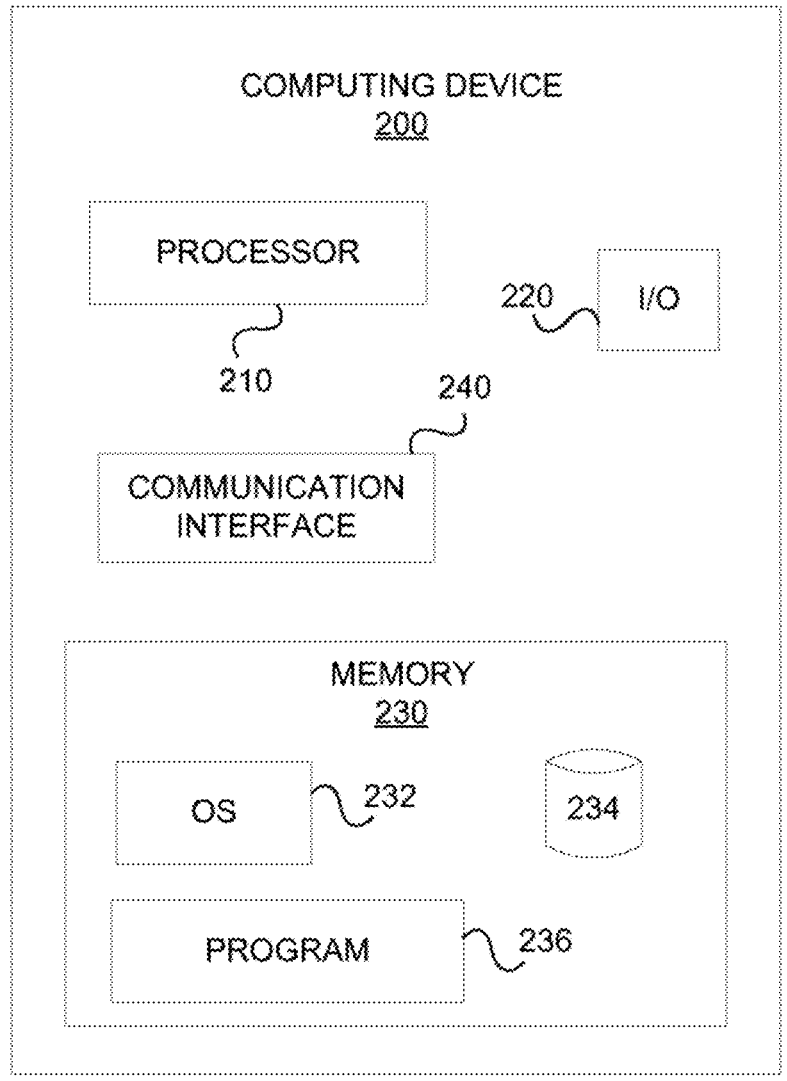
FIG. 2 illustrates a component diagram of an example computing device, according to the disclosed technology.

An example computing device 200 configured to implement the system 100 is shown in more detail in FIG. 2. As shown, the computing device 200 can include a controller 210 (e.g., a processor); an input/output (I/O) device 220; a memory 230, which can contain an operating system (OS) 232, a storage device 234, which can be any suitable repository of data and which can include a memory module and a program 236; and a communication interface 240. The communication interface 240 can include a transceiver. The controller 210 can be in communication with the IMU 104, such as wireless communication, and the controller 210 can be configured to receive data from the IMU 104 and determine various tire health attributes and values based at least in part on the data received from the IMU 104.

The controller 210 can include one or more of an application specific integrated circuit (ASIC), programmable logic device, microprocessor, microcontroller, digital signal processor, co-processor or the like or combinations thereof capable of executing stored instructions and operating upon stored data. The memory can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system, application programs (including, for example, a web browser application, a widget or gadget engine, and or other applications, as necessary), executable instructions and data. The controller 210 can include a secure microcontroller, which can be configured to transmit and/or facilitate secure lines of communication. As will be appreciated, some or all of the processing techniques described herein can be implemented as a combination of executable instructions and data within the memory.

The controller 210 can be one or more known processing devices, such as a microprocessor from the Pentium™ family manufactured by Intel™, the Turion™ family manufactured by AMD™, or the Cortex™ family or SecurCor™ manufactured by ARM™. The controller 210 can constitute a single-core or multiple-core processor that executes parallel processes simultaneously. For example, the controller 210 can be a single core processor that is configured with virtual processing technologies. The controller 210 can use logical processors to simultaneously execute and control multiple processes. The controller 210 can implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The computing device 200 can include one or more storage devices 234 configured to store information used by a controller 210 (or other components) to perform certain functions related to the disclosed technology. As an example, the computing device 200 can include memory 230 that includes instructions to enable controller 210 to execute one or more applications, network communication processes, and any other type of application or software known to be available on computer systems. Alternatively, the instructions, application programs, etc. can be stored in an external storage or available from a memory over a network. The one or more storage devices can be a volatile or non-volatile, magnetic, semiconductor, tape, optical, removable, non-removable, or other type of storage device or tangible computer-readable medium.

The computing device 200 can include memory 230 that includes instructions that, when executed by the controller 210, cause the computing device 200 to perform one or more processes consistent with the functionalities disclosed herein. Methods, systems, and articles of manufacture consistent with the disclosed technology are not limited to separate programs or computers configured to perform dedicated tasks.

The memory 230 can include one or more memory devices that store data and instructions used to perform one or more features of the disclosed technology. The memory 230 can also include any combination of one or more databases controlled by memory controller devices (e.g., one or more servers, etc.) or software, such as document management systems, Microsoft™ SQL databases, Share-Point™ databases, Oracle™ databases, Sybase™ databases, or other relational databases. The memory 230 can include software components that, when executed by the controller 210, cause the computing device 200 to perform one or more processes consistent with the disclosed technology. The memory 230 can include a memory module consistent with the disclosed technology.

The computing device 200 can also be communicatively connected to one or more memory devices (e.g., databases (not shown)) locally or through a network. The remote memory devices can be configured to store information and can be accessed and/or managed by the computing device 200. By way of example, the remote memory devices can be document management systems, Microsoft™ SQL database, SharePoint™ databases, Oracle™ databases, Sybase™ databases, or other relational databases. Systems and methods consistent with disclosed technology, however, are not limited to separate databases or even to the use of a database.

The computing device 200 can include any number of hardware and/or software applications that are executed to facilitate any of the operations. The one or more I/O interfaces can be utilized to receive or collect data and/or user instructions from a wide variety of input devices. Received data can be processed by one or more computer processors as desired in various implementations of the disclosed technology and/or stored in one or more memory devices.

As will be appreciated, the IMU 104 can be mounted at a position having a radius $\rho$ within the perfectly circular tire 102 of outer radius r rolling at angular speed $\dot{\theta}(t)$. The IMU 104 can experience a centripetal acceleration by virtue of the IMU 104 rotating within the tire 102 at angular speed $\dot{\theta}(t)$ at radius $\rho$. If the tire 102 rolls with rotational velocity (t) and accelerates with rotational acceleration $\ddot{\theta}(t)$, the IMU 104 can also experience a linear acceleration associated with the forward acceleration $\alpha_{roll}$ of the tire 102. If the tire 102 slips negligibly against the road or ground as it rolls, then $\alpha_{roll}=r\ddot{\theta}(t)$. As will be appreciated, the amplitude of the linear acceleration can be sinusoidally modulated as the IMU 104 rotates in and out of alignment with the forward motion of the tire 102 (in instances where the tire 102 is traveling forward) along the ground.

Accordingly, the system 100 can be configured to determine a "rolling radius" of the tire 102 based on the dynamics of an accelerating tire 102. That is, for an accelerating tire 102, the system 100 can sense the outer radius r based, at least in part, on the detected translational and rotational accelerations, and based on the principle that the radius r of the tire 102 will decrease as the tire 102 wears and tread depth decreases, the system 100 can determine the tread depth of the tire 102. To determine the tread depth value, the system 100 can compute the ratio of the translational and rotational accelerations to determine the radius r of the tire 102 at any time t. Alternatively, the system 100 can integrate the detected accelerations over some time interval (e.g., some predetermined time interval, some random time interval) to determine changes in translational velocity and rotational velocity and can determine a ratio of the translational and rotational velocities. Alternatively, the system 100 can twice integrate the accelerations to obtain translational and rotational displacements and can determine a ratio of the translational and rotational velocities:

$$r = \frac{a_{roll}(t_1)}{\dot{\theta}(t_1)} = \frac{\int_{t_1}^{t_2} dt' a_{roll}(t')}{\dot{\theta}(t_2) - \dot{\theta}(t_1)} = \frac{\int_{t_1}^{t_2} dt' \int_{t_1}^{t'} dt'' a_{roll}(t'')}{\theta(t_2) - \theta(t_1)} \quad (1)$$

While the IMU 104 may not measure $\alpha_{roll}(t)$ directly, one of skill in the art will understand that the system 100 can be configured to derive this value from the accelerations that the IMU 104 does directly measure, namely $\alpha_r(t)$ and $\alpha_\theta(t)$. For example, the system 100 can be configured to determine $\alpha_{roll}(t)$ using Equation 2 or Equation 3:

$$a_{roll}(t) = \frac{a_\theta(t) - \rho\dot{\theta}(t)^2 - g\cos\theta(t)}{\sin\theta(t)} \quad (2)$$

-continued $$a_{roll}(t) = \frac{a_r(t) + \rho\ddot{\theta}(t) + g\sin\theta(t)}{\cos\theta(t)} \tag{3}$$

where g is the acceleration due to gravity. As will be appreciated, the three ratios shown in Equation 1 are equivalent in an idealized model (e.g., as depicted in FIG. 1), but in a realistic application in which data from the IMU 104 can include "noise," one or more of Equations 1, 2, and 3 can prove more practical than others. Additionally, the third ratio shown in Equation 1 can provide an "inverse wheel odometry" that can be used to compute the radius r of the tire 102 from the distance the tire 102 rolls and the angle through which the tire 102 rolls.

As will be appreciated the above computations can be appropriate for a perfectly round and rigid tire, but in the case of a perfectly round, flexible tire, the size (e.g., radius r) of the tire 102 can change with inflation pressure. Accordingly, the system 100 can be configured to determines tread depth in a differential manner using measurements acquired from the IMU 104. Accordingly, the system 100 can be configured to measure the difference δ between the outer radius r of the tire 102 and the IMU radius ρ:

$$\delta = r - \rho \tag{4}$$

The IMU radius ρ is defined by the position at which the IMU 104 is mounted within the tire 102, and the IMU 104 can be mounted at any radius p. For example, the IMU 104 can be mounted on the wheel hub or the tire inner liner. The system 100 can be configured to compute the IMU radius ρ from the centripetal acceleration of the IMU 104 described above, for example.

To illustrate a possible method of determining δ, it can be helpful to consider a situation in which the IMU 104 is at its highest point (i.e., directly above the center of the tire 102) such that θ(t)=2πn for some integer n. In this case, the IMU 104 can report the acceleration components shown in Equations 5 and 6:

$$\alpha_r(t) = g - \rho\dot{\theta}^2 \tag{5}$$

and $$\alpha_\theta(t) = (\rho + r)\ddot{\theta} \tag{6}$$

Equation 5 indicates that the IMU's 104 radial (vertical) accelerometer registers g in the upward direction. (Because the IMU's 104 accelerometers measure the force necessary to keep a small proof mass stationary with respect to the IMU's 104 body, the component of the total force measured by the IMU 104 that opposes the force of gravity points upward.) Because the IMU 104 is at its highest point on the tire, the instantaneous centripetal acceleration ρ$\dot{\theta}^2$ registers in the downward direction. As can be seen this result does not involve the outer radius r, but the outer radius r does appear in Equation 6. Equation 6 indicates that the IMU's 104 tangential (horizontal) accelerometer registers the sum of two terms: the first term due to rotational acceleration and the second term equal to the tire's translational acceleration r$\ddot{\theta}$(t). Thus, for a perfect IMU 104 having no bias and no noise in its data and at an instant at which θ=2πn, $\alpha_r$, $\alpha_\theta$, $\dot{\theta}$, and $\ddot{\theta}$ can be sampled at that instant and Equations 5 and 6 can be used to compute:

$$\rho = \frac{g - a_r}{\dot{\theta}^2} \tag{7}$$

-continued and $$r = \frac{a_\theta}{\ddot{\theta}} - \frac{g - a_r}{\dot{\theta}^2} \tag{8}$$

Equations 7 and 8 can in turn be used tom compute the distance between the IMU 104 and the outer tread surface:

$$\delta = r - \rho = \left[\frac{a_\theta}{\ddot{\theta}} - 2\frac{g - a_r}{\dot{\theta}^2}\right]_{\theta = 2\pi n} \tag{9}$$

The system 100 can be configured to incorporate many IMU 104 samples into each measurement by, for example, basing the calculations on the output of a well-designed state estimator for θ and $\dot{\theta}$, which can help address the noise present in a realistic IMU 104.

Figure 3:
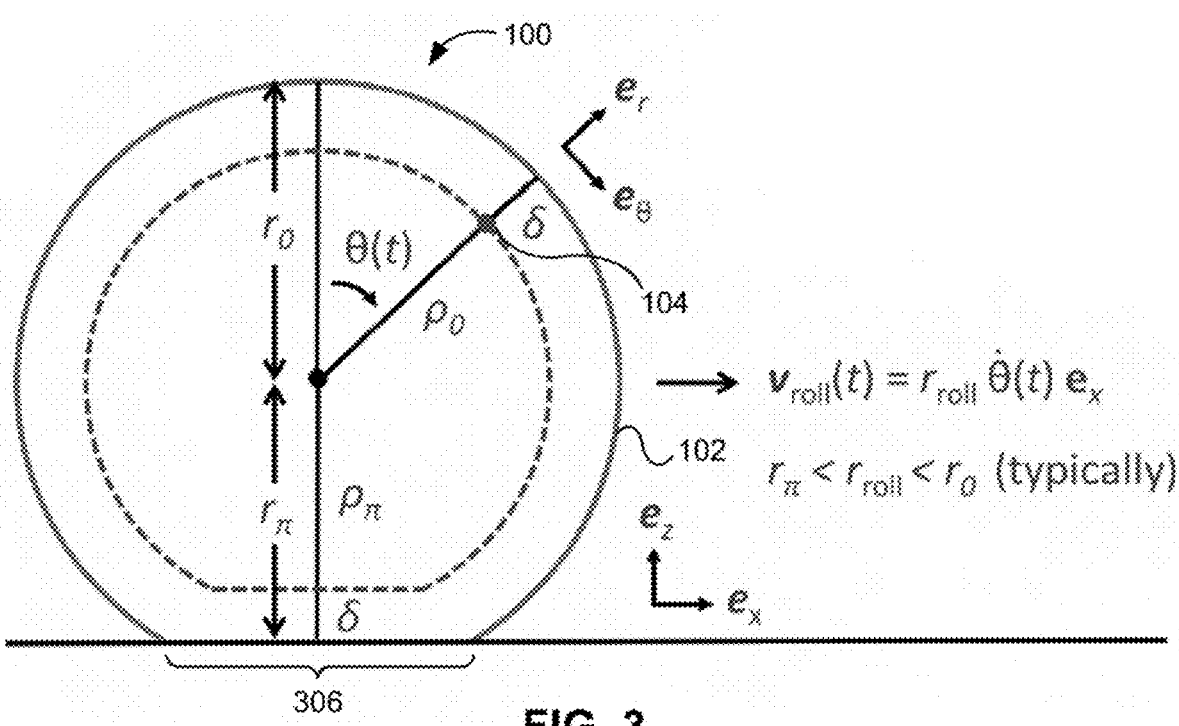
FIG. 3 illustrates a kinematic model of round and flexible tire that includes a contact patch, according to the disclosed technology.

Referring to FIG. 3, in practical use, loaded tires (e.g., tires supporting the weight of a vehicle) experience a flattened contact patch 306 such that the outer radius r and the IMU radius ρ are no longer constants. Instead, the system 100 can be configured to compute the outer radius r and the IMU radius ρ as functions of the IMU angle θ, as the outer radius r and the IMU radius ρ can change as the IMU 104 rolls through the contact patch. More specifically, the system 100 can be configured to assume that r(θ) and ρ(θ) are both constant everywhere outside the contact patch 306 and that both r(θ) and ρ(θ) change within a region around θ=π. Thus, at IMU angles θ outside the contact patch 306:

$$r(\theta) = r_0 \tag{10}$$

and $$\rho(\theta) = \rho_0 \tag{11}$$

where $r_0$ and $\rho_0$ are constants.

In order for the tire 102 to take on the flattened shape of the contact patch 306, the tread of the tire 102 must bunch up as it enters the patch and then relax as it exits the patch. This gives rise to an effective "rolling radius" that may not be equal to either the loaded radius $r_\pi$ or unloaded radius $r_0$ of the tire.

The rolling radius of the tire 102 can be defined as the ratio of the lateral road speed of the tire 102 to the angular speed of the tire 102:

$$r_{roll} = \frac{v_{roll}}{\dot{\theta}} \tag{12}$$

Figure 4:
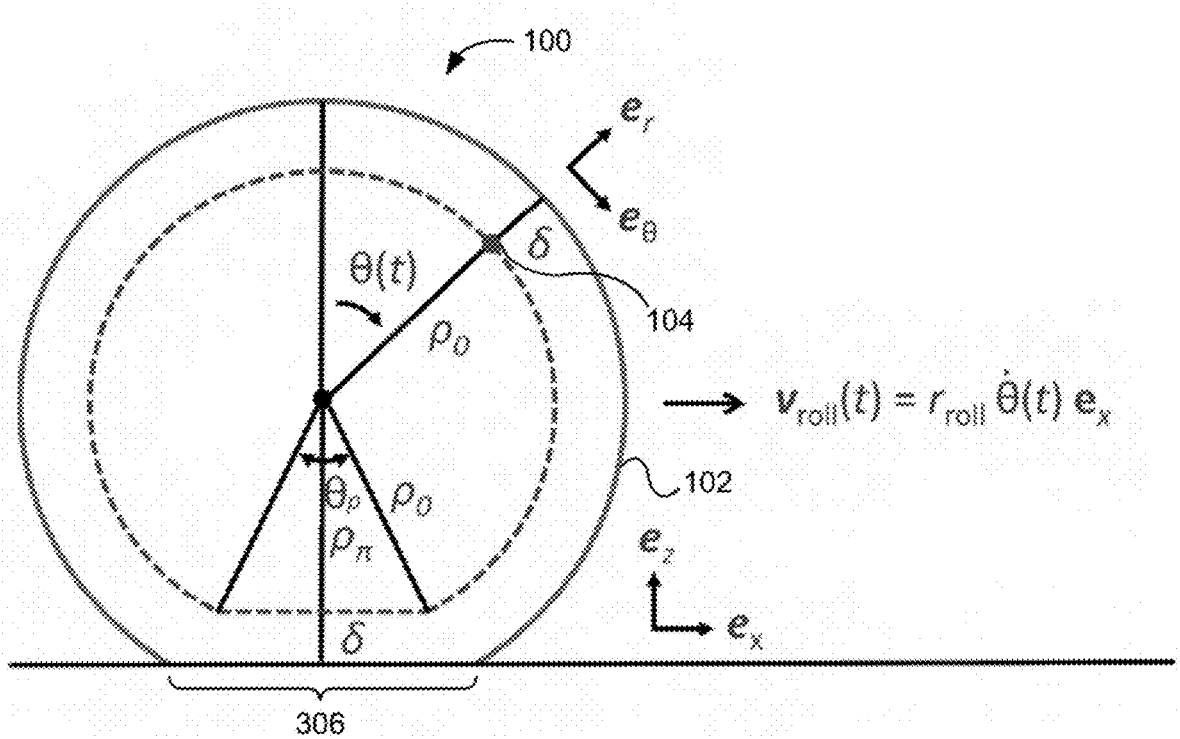
FIG. 4 illustrates a kinematic model of round and flexible tire that includes a contact patch, according to the disclosed technology.

As shown in FIG. 3, the rolling radius of the tire 102 can be between the loaded radius $r_\pi$ and unloaded radius $r_0$ of the tire 102. As discussed herein, it can be advantageous to compute a difference δ (Equation 4) between the radius of the IMU 104 and the rolling radius of the tire 102, rather than attempting to compute the outer radius r itself, as the difference δ can be less sensitive to inflation pressure. In the case of a flattened tire 102, the system 100 can be configured to calculate a modified differential $\delta = r_{roll} - \rho_\pi$. Because the IMU 104 does not experience meaningful centripetal acceleration as it traverses the flat contact patch 306, calculation of $\rho_\pi$ can require the system 100 to perform additional modeling. Referring to FIG. 4 and as described in more detail below, the system 100 can be configured to calculate $\rho_\pi$ from a trigonometric analysis of the angular extent of the contact patch 306, which is itself measured by "dead reckoning" the IMU 104 through the contact patch 306. It is to be understood that the label of "306" shown in FIG. 3, as well as any other figures illustrating graphical representations of IMU data, references IMU data that is indicative of the IMU 104 travelling through the contact patch 306, whereas the labels of "306" in FIGS. 3 and 4 indicate the actual contact patch 306 itself.

Alternatively, the computing device 200 can be configured to compute the differential for a flattened tire as:

$$\delta' = r_{roll} - \rho_0 \tag{13}$$

While δ' may not correspond to any physically extensive quantity at a particular angular location (in that $r_{roll}$ exists within the contact patch 306 and $\rho_0$ exists outside the contact patch 306), monitoring the difference between them can still provide an effective approach to offsetting the effects of inflation pressure and vehicle loading on the individual quantities. Alternately, the computing device 200 can be configured to estimate the specific differential $$\delta_\pi = r_\pi - \rho_\pi \approx r_{roll} - \rho_\pi \tag{14}$$

where $\rho_\pi = \rho(\pi)$, which is the IMU radius ρ when the IMU 104 is at its lowest point (i.e., directly below the center of the tire 102).

Equations 5 and 6 give components of the acceleration experienced by the IMU 104 at particular isolated time instants only. Corresponding expressions valid for all times at which θ lies outside the contact patch 306 and the associated transition regions are:

$$\alpha_r(t) = r_{roll} \sin\theta(t)\ddot{\theta}(t) - \rho_0\dot{\theta}(t)^2 + g\cos\theta(t) \tag{15}$$

and $$\alpha_\theta(t) = [r_{roll}\cos\theta(t) + \rho_0]\ddot{\theta}(t) - g\sin\theta(t) \tag{16}$$

While the IMU angle θ is in and immediately adjacent to the contact patch 306, the IMU's 104 outputs may no longer reflect $\alpha_r$, $\alpha_\theta$, $\ddot{\theta}$ as depicted in FIG. 3, as there may be additional rotation of the IMU 104 body due to the deformation of the tread.

The computing device 200 can be configured to use Equations 15, 16, and/or a suitably constructed state estimator to extract the rolling radius $r_{roll}$ and IMU radius $\rho_0$ to compute the differential δ'. As noted above, computing $\delta_\pi$ requires additional modeling to determine $\rho_\pi$, which is not the same as $\rho_0$. To compute $\delta_\pi$, the computing device 200 can be configured to use Equations 15 and 16 and an accurate estimator for the IMU angle θ to determine the vertical acceleration $\alpha_z$ of the IMU 104 as a function of time and subsequently double integrate the vertical acceleration $\alpha_z$ as the IMU 104 moves from its apex (θ=2πn) to the point where it starts to enter the contact patch 306 (and Equations 15 and 16 begin to fail). This can indicate the change in height of the IMU 104 as it rolls around the axle, and since the height is $\rho_0 + \rho_\pi$, the computing device 200 can be configured to determine an approximation for $\rho_\pi$.

Alternatively, the computing device 200 can be configured to determine $\rho_\pi$ based on the IMU's 104 outputs to detect the angle $\theta_p$ subtended by the contact patch 306, and the computing device 200 can be configured to then compute:

$$\rho_\pi = \rho_0 \cos(\theta_p/2) \tag{17}$$

Because all outputs from the IMU 104 ideally go to known constants when the IMU 104 enters the contact patch 306, the computing device 200 can be configured to determine when the IMU 104 is in the contact patch 306. The computing device 200 can also be configured to measure $\dot{\theta}_{in}$ and $\dot{\theta}_{out}$ just before the IMU 104 enters the contact patch 306 and just after the IMU 104 exits the contact patch 306. The computing device 200 can be configured to subsequently calculate $$\theta_p \approx \Delta t(\dot{\theta}_{in} + \dot{\theta}_{out})/2 \tag{18}$$

where Δt is the time the IMU 104 spends in the contact patch 306. Alternatively or in addition, the system 100 can include a second IMU 104. For example, the second IMU 104 can be positioned directly opposite the first IMU 104 with respect to the center of the tire 102, which may increase or maximize the amount of useful data by ensuring that at least one IMU 104 will always be outside the contact patch 306. This may provide a better estimate of $\dot{\theta}$.

Equations 15 and 16 describe the acceleration components experienced by an IMU 104 that is physically aligned with the equatorial plane of a tire 102 that is itself aligned with respect to the direction of rolling. The more general situation of a misaligned IMU 104 and a misaligned tire 102 rolling in a fixed direction can be described as follows. First, let u be a constant unit vector that points along the axis of rotation of the tire 102 in a right-hand sense. Then, $$u = \begin{cases} \cos\kappa\sin\tau e_x + \cos\kappa\cos\tau e_y - \sin\kappa e_z & \text{for the left wheel} \\ -\cos\kappa\sin\tau e_x + \cos\kappa\cos\tau e_y + \sin\kappa e_z & \text{for the right wheel} \end{cases} \tag{19}$$

where $e_x$ and $e_z$ are as defined in FIG. 1, and $e_y = e_z \times e_x$. Here κ and τ are the tire's 102 camber and toe angles, respectively, with toe defined relative to the direction of rolling rather than to the vehicle's longitudinal axis. If τ≠0, the condition of rolling without slipping of the tire 102 against the road surface as discussed above can no longer hold but can be replaced by a condition of rolling with negligible azimuthal slipping, resulting in a forward tire acceleration of $\alpha_{roll} = r_{roll} \sec\tau\ddot{\theta}(t)$. The rotation axis vector u can be used to define a set of constant orthonormal basis vectors $\tilde{e}_\theta$, $\tilde{e}_u$, and $\tilde{e}_r$ aligned with the tire:

$$\tilde{e}_\theta = \frac{u \times e_z}{\|u \times e_z\|} \tag{20}$$

$$\tilde{e}_u = u \tag{21}$$

$$\tilde{e}_r = \tilde{e}_\theta \times \tilde{e}_u \tag{22}$$

The instantaneous displacement of the IMU 104 from its center of rotation can now be written as $R_u(\theta(t))(\rho_0\tilde{e}_r)$, where $R_u(\varphi)$ is an orthogonal matrix that rotates any vector it left-multiplies by an angle φ in a right-handed sense about the axis defined by u. (Thus the IMU's 104 displacement passes through the "top dead center" value $\rho_0\tilde{e}_r$ each time θ(t) passes through a multiple of 2π.) The above definitions can be used to generalize Equations 15 and 16 for the accelerations sensed by the IMU 104's accelerometers to $$\alpha_i = [R_u(\theta(t)A\tilde{e}_i] \cdot [r_{roll}\sec\tau\ddot{\theta}(t) + ge_z + \rho_0 R_u(\theta(t))\tilde{e}_r] \tag{23}$$

where i represents θ, u, or r, and where A is a constant orthogonal matrix that characterizes the misalignment of the IMU relative to the tire. Similarly the angular rates sensed by the IMU's gyroscopes can be written as $$\omega_i = [R_u(\theta(t))G\tilde{e}_i] \cdot u\dot{\theta}(t) \tag{24}$$

where i represents θ, u, or r, and where G is a constant orthogonal matrix that characterizes the misalignment of the IMU 104 relative to the tire 102. One skilled in the art will appreciate that the accelerations and angular rates reported by a real IMU 104 may not be exactly as predicted by Equations 23 and 24 but may include contributions from imperfections such as bias and noise. It will also be appreciated that Equations 23 and 24 can be written in many equivalent forms, including forms chosen to be convenient for efficient computation.

As will be appreciated, as the tire 102 comes to a stop, the computing device 200 can be configured to use the temporarily constant components of the gravitation constant $ge_z$ as measured by the IMU's 104 accelerometers to determine the IMU's 104 orientation. Thus, the computing device 200 can then have a $\theta(t_0)$ to integrate from as the tire 102 accelerates away from the stopped position. Such known-stationary states can permit the computing device 200 to measure and calibrate out IMU biases, which may tend to be significant and may drift unpredictably over time. The computing device 200 can be configured to reduce or minimize such errors by limiting how long measurements are taken by the IMU between bias nullings performed by the computing device 200 (e.g., at stop points of the tire 102). Thus, the computing device can be configured to determine the vehicle is coming to a stop, null out any gyro biases of the IMU, determine $\theta(t_0)$ based on data from the IMU's 104 accelerometers, determine the vehicle is beginning to accelerate, sample the IMU 104 rapidly for a brief interval (e.g., one revolution of the tire), and process the results to produce a tread measurement.

As described herein, changes in the rolling radius of a tire 102 can correspond to changes in tread depth of the tire 102, and the pressure, temperature and/or load on the tire can affect the rolling radius of a tire 102. To increase the overall accuracy of the system 100, the system 100 can include one or more pressure sensors configured to detect and/or monitor the internal pressure of the tire 102, and/or the system can include one or more temperature sensors configured to detect and/or monitor the temperature of the tire 102. Alternately, the system 100 can include a geolocation sensor and can be configured to look up the local temperature from, for example, a third-party weather service to estimate a temperature of the tires 102. Furthermore, as discussed herein, the differential approach to determining the tread depth of the tire 102 can decrease the impact of varying pressure on the tread depth calculation.

While it is currently difficult to determine vehicle load directly (e.g., weight of the vehicle, passengers, and cargo), the impact of the load variable can be overcome by aggregating IMU data and determining an estimated tread depth based on large, aggregated trends of data. That is, the computing device 200 can be configured to evaluate whether the rolling radius is decreasing over time, which can be indicative of the tread depth decreasing over time. Furthermore, as discussed herein, the differential approach to determining the tread depth of the tire 102 can decrease the impact of varying vehicle load on the tread depth calculation.

The system 100 can be configured to measure the change in tread depth over time. For example, the system 100 can be configured to measure or estimate a decrease in a tire's 102 rolling radius over time and can determine a corresponding decrease in the tire's 102 tread depth by, for example, applying the system and any of the methods described herein. The system 100 can be configured to receive an indication of the model of tire installed on a vehicle so as to determine a starting tread depth of the tire 102, or the system 100 can be configured to receive one or more measurement values associated with the starting tread depth of a tire 102 installed on a vehicle. The system 100 can assign a default tread depth for a new tire 102 (e.g., $^{10}/_{32}$", $^{11}/_{32}$"). The system 100 can assign a default tread depth for a new tire 102 unless different values or other information corresponding to the new tire 102 is provided (e.g., a measured tread depth or a make/model of the tire). As time progresses and the system 100 monitors and determines a decrease in the tread depth of the tire, the system 100 can be configured to receive one or more measurement inputs associated with a measured tread depth of the tire 102. These one or more measurement inputs can be used by the system 100 to validate, correct, and/or update the current tread depth of the tire 102 according to the system.

Alternately or in addition, the system 100 can be configured to measure the actual tread depth of a tire 102 by, for example, applying the system and methods described herein. Such a configuration may require more precise measurements by the IMU 104 and/or other sensors (e.g., as compared to determining a decrease in tread depth over time), but such a configuration can be configured to measure the actual tread depth of the tire 102 without requiring a starting tread depth to be inputted into the system 100.

Alternatively or in addition, the system 100 can be configured to determine an extent of the contact patch 306 of the tire based on measurements from the IMU 104. For example, the system 100 can be configured to determine the angular extent of the contact patch 306.

Alternatively or in addition, the computing device 200 can be configured to detect relatively quiescent periods of time in which the an IMU 104 adhered to the inner liner of the tire 102 is essentially stationary relative to the ground as it traverses through the contact patch 306. Specifically, the computing device can detect such periods by locating relatively constant values of linear accelerations and angular velocities within the IMU measurements.

Figure 5:
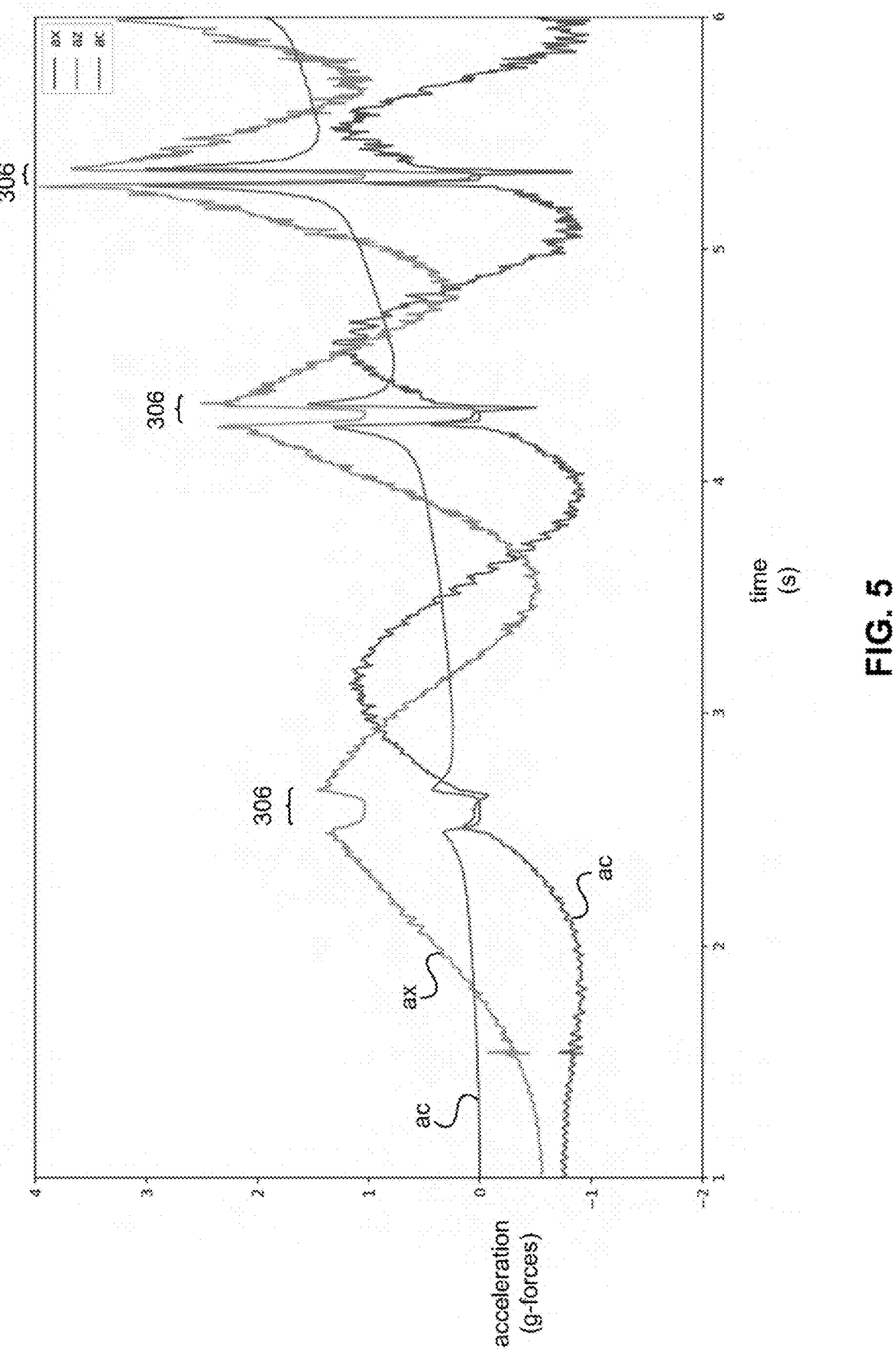
FIG. 5 illustrates a graph depicting example IMU data corresponding to an accelerating tire, according to the disclosed technology.

FIG. 5 shows example acceleration measurements from an IMU 104 mounted on the inner liner of a rotationally accelerating tire 102. The periods of time during which the IMU 104 is within the contact patch 306 can be readily apparent as the measured accelerations can abruptly revert to relatively constant values. The duration of these periods can decrease as the tire 102 accelerates, though the angular extent of the contact patch 306 (i.e., the fraction of the entire tire 102 rotation spanned by the quiescent periods) can remain approximately constant.

Figure 6:
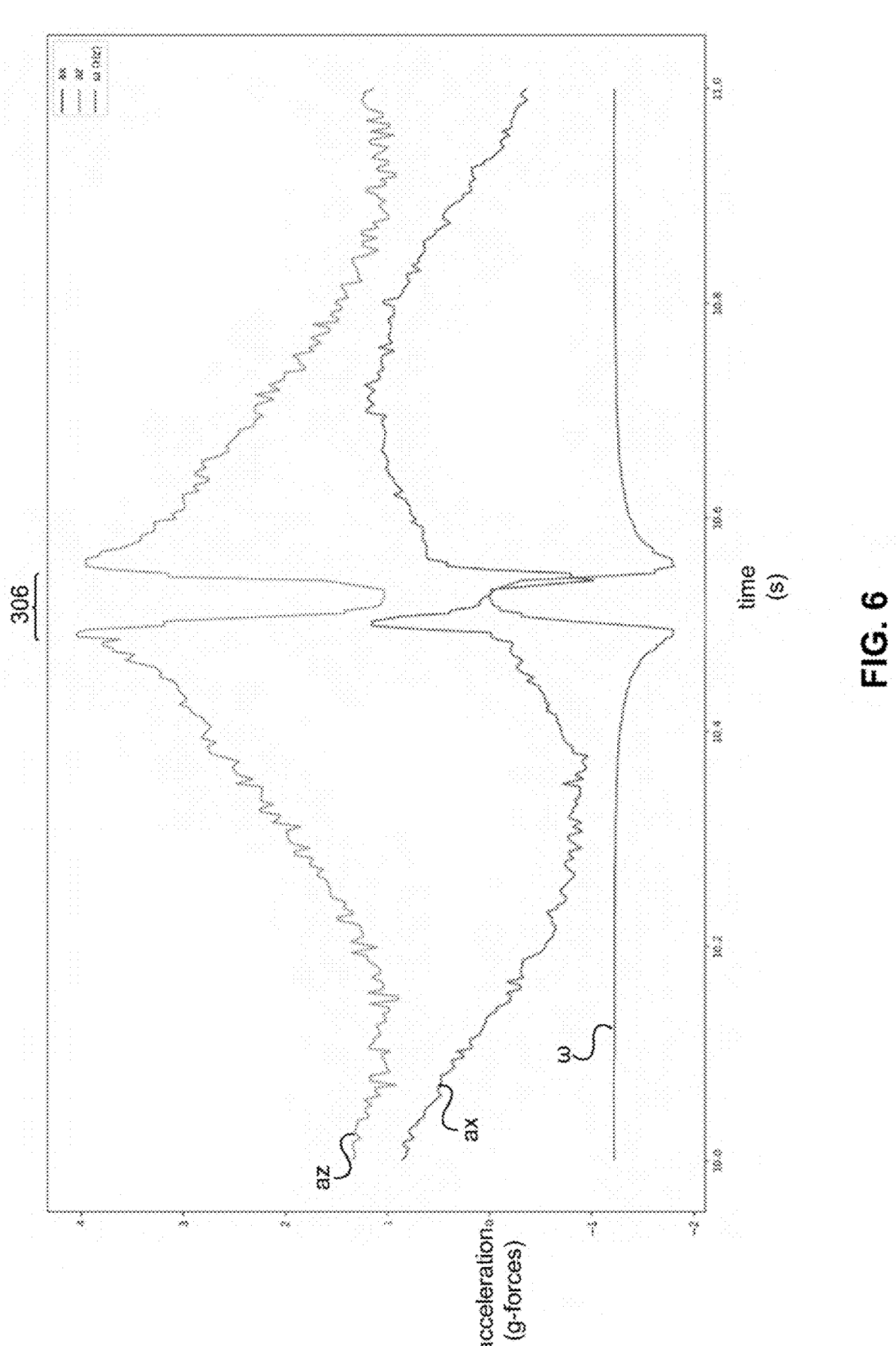
FIG. 6 illustrates a graph depicting example IMU data corresponding to a contact patch, according to the disclosed technology.

FIG. 6 provides a more detailed view of an example traversal of the contact patch 306 by the IMU 104, showing additional features of the IMU data that can be used by the computing device 200 to determine the extent of the contact patch 306. The inward acceleration (az) can abruptly revert to a value of 1.0 as the centripetal acceleration associated with following a circular trajectory ceases and the IMU 104 traverses the flat contact patch 306—only the acceleration of gravity may remain. The acceleration of the IMU 104 about an axis tangent to the tire perimeter (ax) can briefly have a value of zero within the contact patch 306. Positive and negative spikes on the edges of the patch can indicate a circumferential compression then extension of the tire wall as it enters then exists the contact patch 306. The angular velocity of the IMU 104 about an axis parallel to the axle of the tire and/or wheel (ω) can generally be zero or substantially close to zero through the contact patch 306. On either side of the zero-valued period, there can be brief peaks of larger angular velocity as the IMU 104 abruptly "tips" into and out of the contact patch 306.

Figure 7:
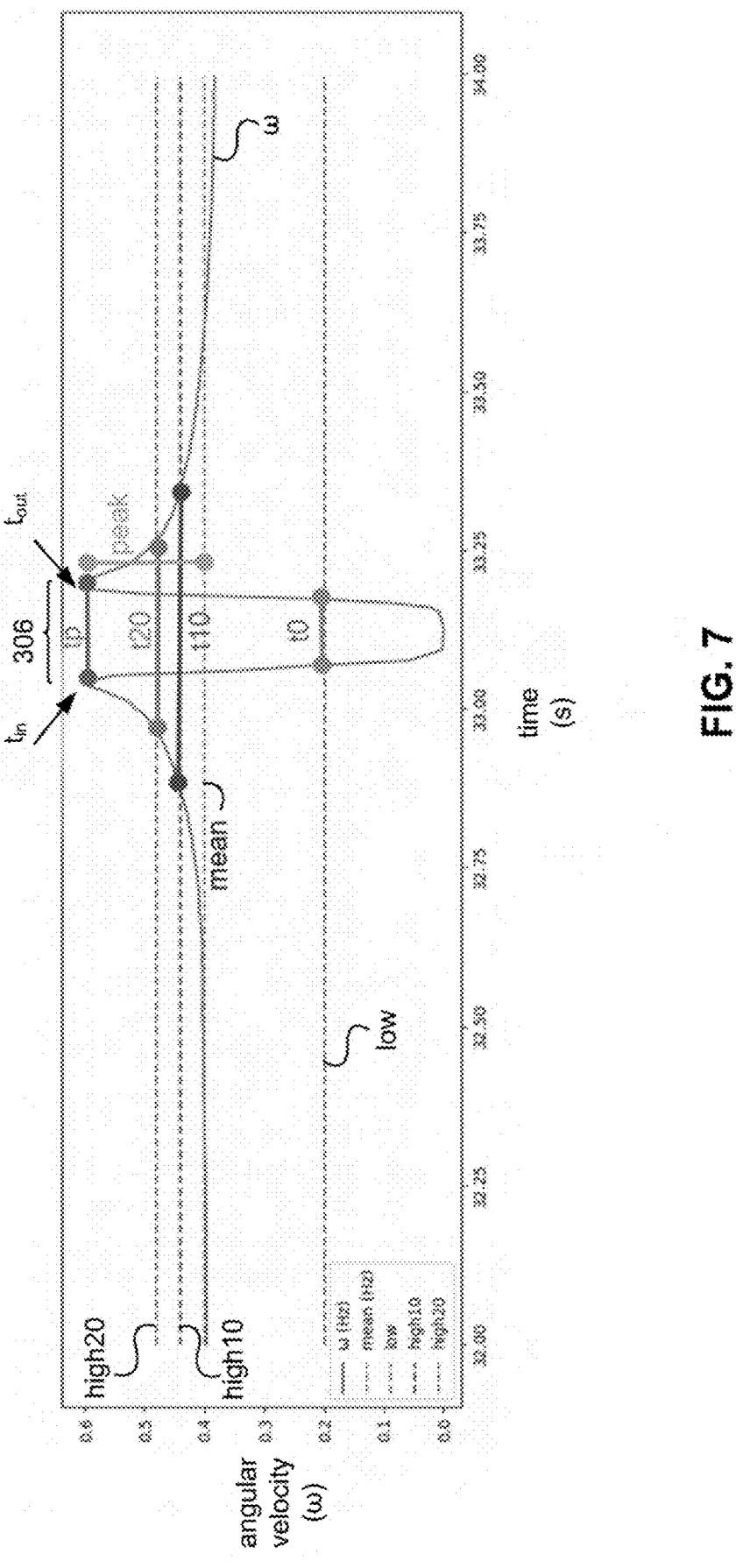
FIG. 7 illustrates a graph depicting example IMU data corresponding to a contact patch, according to the disclosed technology.

The computing device 200 can use any of several measures to quantify the extent of the contact patch 306. FIG. 7 provides a pictorial representation of these measures relative to the dip in angular velocity ($\omega$) measured by the IMU 104 as it passes through the contact patch 306. The computing device 200 can use the following definitions to enumerate the quantities of FIG. 7:

to—time near zero (less than half mean angular velocity);

tp—time between peaks on either side of dip in angular velocity;

t20—time spent more than 20% above mean angular velocity;

t10—time spent more than 10% above mean angular velocity; and peak—ratio of peak angular velocity to mean angular velocity.

Consistent with the methodologies described herein, the angle subtended by the contact patch 306 at the axle associated with the tire 102 can be referred to as the contact patch angle $\theta_p$ (see FIG. 3). The contact patch angle $\theta_p$ can refer to the angle between the "entry" and "exit" instants $t_{in}$ and $t_{out}$ associated with the beginning and end of the contact patch 306. That is, assuming a constant rotational speed, a larger difference between $t_{in}$ and $t_{out}$ will correspond to a larger contact patch angle $\theta_p$. Example entry and exit instants can include the moments at which IMU data (e.g., angular velocity data, linear acceleration data, magnetic field strength) passes (e.g., becomes greater than, becomes less than) a predetermined percentage of the corresponding average IMU data or the corresponding average IMU data when the IMU 104 is outside the contact patch 306. Other example entry and exit instants can include the moments at which the IMU data reaches or passes predetermined maxima or minima of the IMU data that is associated with the contact patch 306. Regardless of the threshold(s) used, a first IMU data threshold can correspond to the entry instant $t_{in}$ and a second IMU data threshold can correspond to the exit $t_{out}$. The first IMU data threshold can be different from the second IMU data threshold. Alternatively, the first IMU data threshold can be the same as the second IMU data threshold.

As an illustrative example, FIG. 7 depicts a graphical illustration of example entry and exit instants corresponding to gyroscopic IMU data; although entry and exit instant can be determined from acceleration data, too. To provide the IMU data for most accurately determining $\theta_p$, it can be useful to obtain and analyze gyroscope data corresponding to a gyroscopic sensor (e.g., IMU 104) that is aligned with, or nearly aligned with, the rotation axis of the tire 102 and accelerometer data corresponding to an acceleration sensor (e.g., IMU 104) that is aligned orthogonally, or nearly orthogonally, to that axis. For example, the IMU 104 can include a gyroscope with one or more gyroscope axes, an accelerometer with two or more accelerometer axes, or a combination thereof. The gyroscopic sensor can be the same sensor as the acceleration sensor (e.g., IMU 104), or they can be different sensors (e.g., multiple IMUs 104). That is, a single IMU 104 can include both a gyroscope and an accelerometer (or any other motion measuring device); however, it is also contemplated that a first IMU 104 can include a gyroscope, while a second IMU 104 can include an accelerometer.

As tread depth decreases over the life of a tire 102, certain aspects and features of the tire 102 change, and changes in these aspects or features can be used to determine or approximate the tread depth of the tire 102. The relationships between tread depth wear and changes in these aspects or features can be specific to each tire model. Thus, a tread depth estimation model can be constructed for a given tire model, and the tread depth estimation for that tire model need not be altered or replaced unless a manufacturing change or some other change occurs that results in different deformation characteristics of the tire model.

For example, as tread depth decreases, the size and shape of the contact patch 306 changes. More specifically, the width of the contact patch 306 (which can be expressed as $\theta_p$) can change as tread depth decreases. Typically, the width of the contact patch 306 will decrease as the tread depth decreases, although for some models of tire, the width of the contact patch 306 may increase as the tread depth decreases. Regardless, it is possible to associate changes in the width of the contact patch 306 with decreases in tread depth, as discussed herein. As a related example, as tread depth changes, the tilt angle, speed, and other aspects of the tire 102 (and the liner of the tire 102) within the contact patch 306 can also change.

Multiple methods or models can be employed to determine the contact patch angle $\theta_p$. For example, the contact patch angle $\theta_p$ can be determined based on entry instant $t_{in}$ and exit instants $t_{out}$. A first method, Method 1, can include constructing a wheel rotation model (e.g., implementing some or all of Equations 15, 16, and 19-24), determining the angles $\theta_{in}$ and $\theta_{out}$ that correspond to $t_{in}$ and $t_{out}$, respectively, and computing the contact patch angle $\theta_p$ as the contact patch exit angle $\theta_{out}$ less the contact patch entry angle $\theta_{in}$. For example, a state estimator (e.g., Kalman filter, regression analyzer) can be configured to determine the contact patch angle $\theta_p$.

Figure 8:
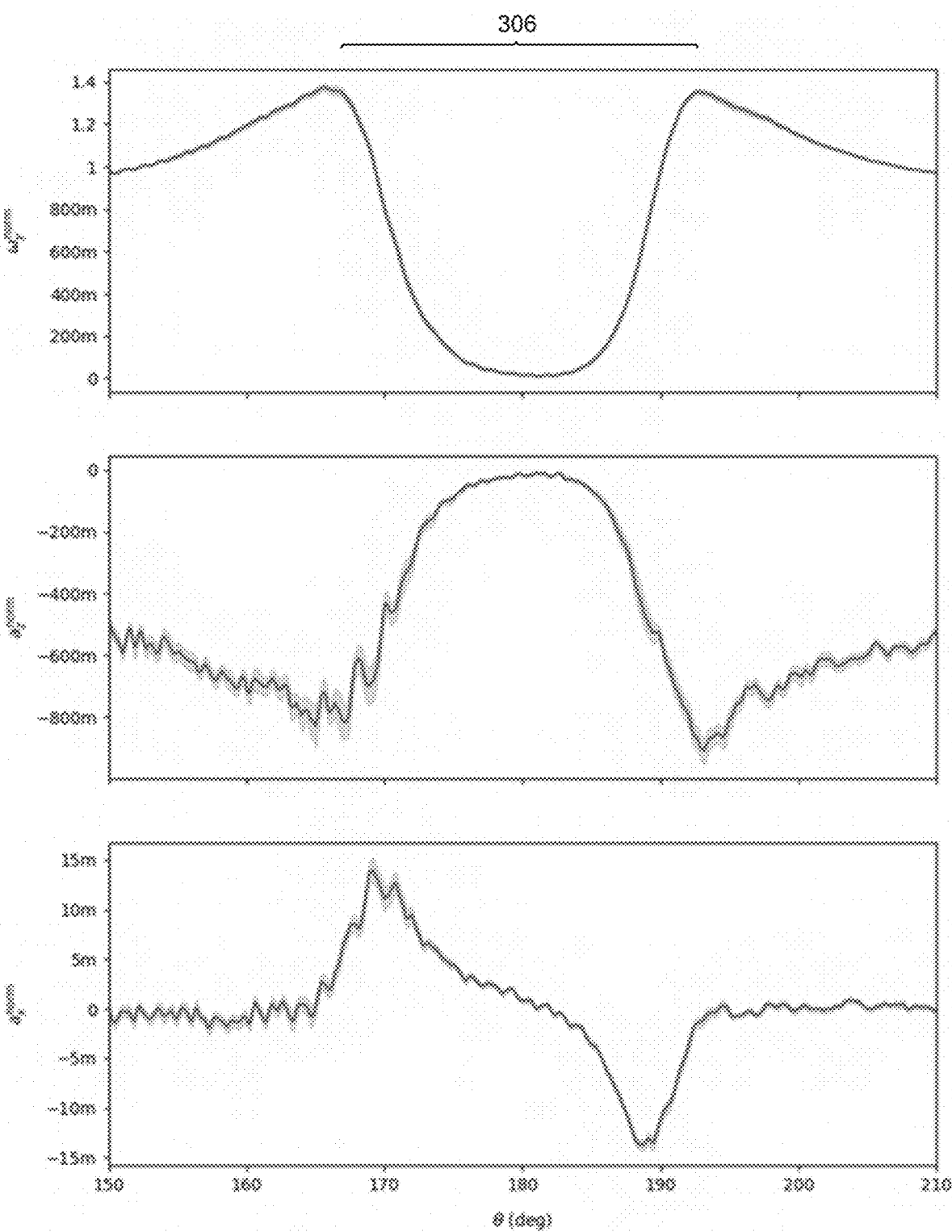
FIG. 8 illustrates graphs of three example waveforms corresponding to three types of normalized data from an IMU that corresponds to a contact patch from an IMU, according to the disclosed technology.

Because a tire angle $\theta$ can be associated with every time instant t, the IMU data can be expressed as one or more functions of $\theta$ rather than t. This in turn allows normalized versions of multiple contact patch waveforms (corresponding to respective types of IMU data) to be aligned with one another and coherently averaged in order to reduce the effects of random noise. This normalization can be performed even if the different contact patch waveforms were sampled at different wheel rotation rates $\omega$. It can be useful to perform the normalizations such that the results are approximately independent of $\omega$. For example, a suitable normalization for gyroscope rates can be performed by dividing the gyroscope rate data $\omega$. FIG. 8 depicts an example of three waveforms corresponding to three types of normalized data—$\omega_y$data, $\alpha_z$ data, and $\alpha_x$data—that are each the result of averaging approximately 40 normalized IMU waveforms (from a gyroscope aligned with the tire's 102 rotation axis ($\omega_y$ data) and from two accelerometers aligned orthogonally to that axis ($\alpha_z$ data and $\alpha_x$data) and aligned such that the contact patch portions of the respective data type generally aligns with that of the other types of data.

Another example method, Method 2, involves estimating the tire rotation rate $\omega$ by averaging tire rotation rates $\omega^{gryo}$ sampled from gyroscope data at times (or angles) well removed from the contact patch 306 and calculating $\omega(t_{out} - t_{in})$ to determine the contact patch angle $\theta_p$. Any misalignment of the IMU 104's gyroscope axes with the tire 102 can be circumvented or minimized by computing the Euclidean magnitude of the three rate components before averaging:

$$\omega^{gyro} = \left[ (\omega_1^{gyro})^2 + (\omega_2^{gyro})^2 + (\omega_3^{gyro})^2 \right]^{\frac{1}{2}} \tag{25}$$

In addition or alternatively, values of $\theta_p$ from multiple contact patch traversals can be averaged to reduce the effects of random noise.

Another example method, Method 3, involves estimating the rotation rate $\omega$ of the tire 102 by dividing $2\pi$ radians by the average time between successive contact patches 306 and computing: $\theta_p = \omega(t_{out} - t_{in})$. In addition or alternatively, values of $\theta_p$ from multiple contact patch traversals can be averaged to reduce the effects of random noise.

Yet another example method, Method 4, involves partitioning all IMU data into a first group for data obtained inside contact patches (i.e., between $t_{in}$ and $t_{out}$ for any contact patch 306) and a second group for data obtained outside contact patches over one or more complete rotations (e.g., as determined using successive $t_{in}$ instants). The partitioning can be performed after the data has been collected or while sampling from the IMU 104 (e.g., receiving data from the IMU 104), and the sampling can be performed at a constant rate. Corresponding sample counts $N_{in}$ and $N_{out}$ can be used to compute $\theta_p = 2\pi N_{in}/N_{out}$. It will be appreciated that Method 4 can be equivalent to Method 3 but does not explicitly reference time or rate values.

These and any other such methods can provide differing balances of accurate results and computational efficiency. For example, Method 1 can typically produce the most accurate results, particularly under acceleration conditions of the tire 102, but Method 1 also requires the most computational power of these example methods. Methods 2, 3, and 4 are typically less computationally expensive than Method 1, and Methods 3 and 4 generally provide the added benefits of being insensitive to both sample rate (assuming it is essentially constant) and IMU scale calibration. To limit errors due to acceleration when using Methods 2 through 4, it can be helpful to repeatedly measure the time interval (or number of samples) between successive contact patches 306 (e.g., measuring successive $t_{in}$ instants) and evaluate estimated tread depth only during periods (i.e., stretches of successive contact patches 306) in which this interval stays relatively constant (e.g., below a predetermined amount of variation or deviation from an average $t_{in}$ instant). Regardless of the method used, it can be beneficial to perform lowpass filtering of IMU data before use, which can help provide more accurate results.

In addition or alternatively, a peak tire rotation rate ratio $r_{peak}$ (illustrated in FIG. 7) (i.e., the ratio of peak angular velocity to mean angular velocity for at least one rotation of the tire) can be used to determine the contact patch size. As an example, the peak tire rotation rate ration $r_{peak}$ can be measured by extracting peak and average rotation rates from estimated (and perhaps coherently averaged) gyroscope waveforms generated by a state estimator of the type described in Method 1 above. As another example, the peak tire rotation rate ration $r_{peak}$ can be measured by extracting corresponding peak and average rotation rates from raw or lowpass-filtered gyroscope data and averaging over multiple contact patch traversals. As will be appreciated, any errors due to acceleration can be greatly reduced when a state estimator is used. Any such errors can be reduced, in addition or alternatively, by evaluating tread depth only during periods when the inter-patch interval remains nearly constant.

Figure 9:
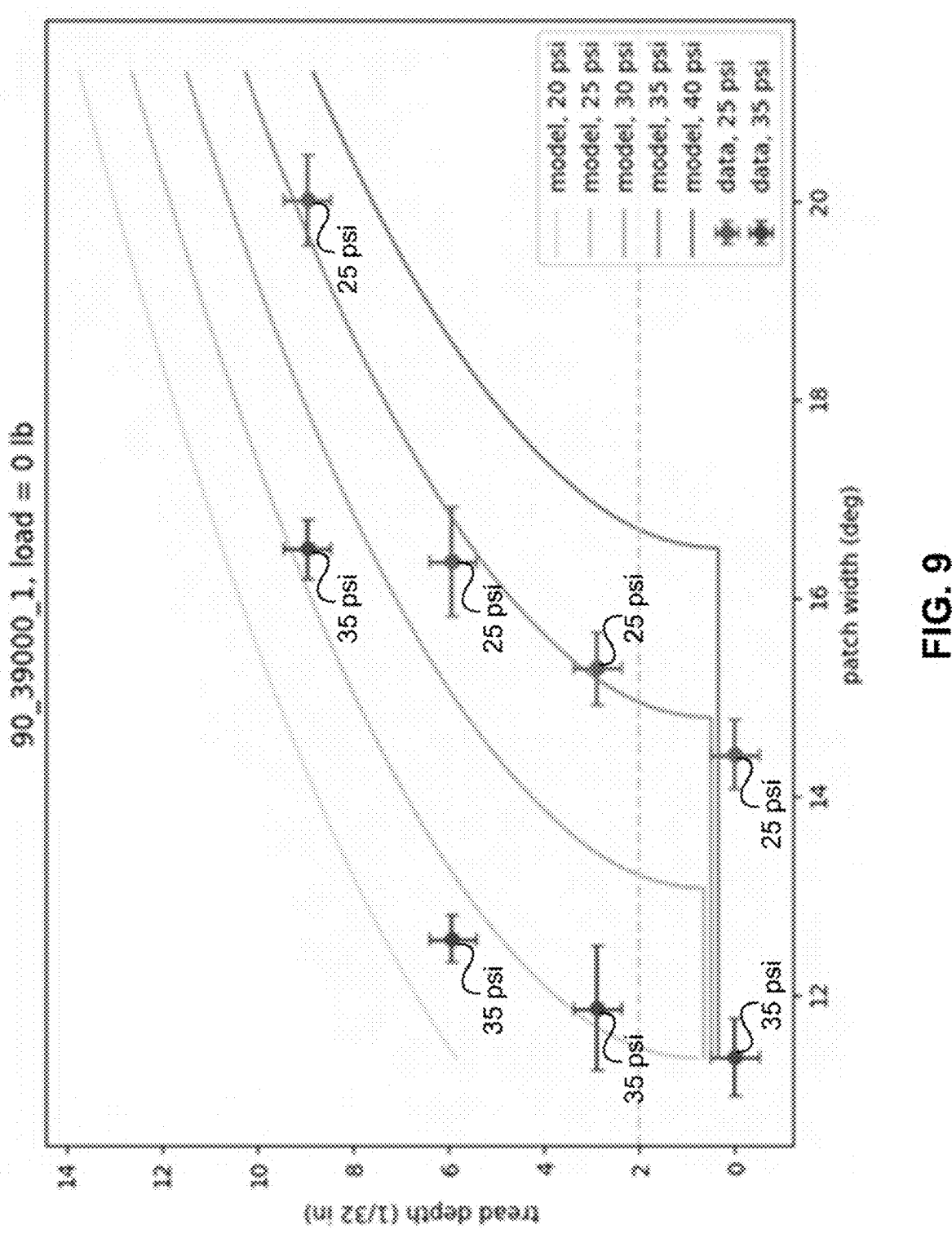
FIG. 9 illustrates a graph depicting the dependence of tread depth on the contact patch angle $\theta_p$ and tire pressure, according to the disclosed technology.

Both the contact patch angle $\theta_p$ and the peak tire rotation rate ratio $r_{peak}$ can typically depend on tire pressure and wheel load, in addition to tread depth. Specifically, both of these features tend to increase with decreasing pressure. Accordingly, it can be helpful to incorporate a pressure sensor (e.g., into the IMU sensor 104, although a pressure sensor separate from the IMU sensor 104 can be used) and to include pressure dependence in the tire-model-specific models relating the contact patch angle $\theta_p$ and the peak tire rotation rate ration $r_{peak}$ to tread depth changes. The outcome of the characterization for each tire model is then a function that maps the contact patch angle $\theta_p$ to tread depth and/or the contact patch angle $r_{peak}$ to tread depth, as well as the and pressure to tread depth. For illustrative purposes only, FIG. 9 provides a graph depicting the dependence of tread depth on the contact patch angle $\theta_p$ and tire pressure (under zero-load conditions).

If wheel load is desired to be included in the model(s), load data from a load cell or another sensor configured to measure load, pressure, and/or force (e.g., as discussed more fully below) can be used. Alternatively, a backend analysis can be performed to compute (e.g., by the system 100) nominal tread depths without regard to load and a history of the results can be maintained (e.g., by the system 100) such that historical data detailing load over time is created. Because vehicle load, and therefore wheel or tire load, typically increases and decreases over time within a limited range, the system 100 can analyze the history of computed nominal tread depths to determine a long-term trend or relationship between the computed nominal tread depths and the corresponding real tread depth decrease. As a simple example, measurements made when a vehicle is minimally loaded typically produce the smallest nominal tread depth values (when load dependence is omitted from the computation), so an accurate tread depth trend can be obtained from just the values at the local minima, or valleys, of the nominal tread depth history.

In addition or alternatively, load changes can be estimated by exploiting differences in the way different features like the contact patch angle $\theta_p$ and the peak tire rotation rate ration $r_{peak}$ depend on load. If their load dependences of the contact patch angle $\theta_p$ and the peak tire rotation rate ration $r_{peak}$ are sufficiently different (which is the case for at least some tire models), to the system 100 can construct a function or model that maps multiple feature values (e.g., data indicative of the contact patch angle $\theta_p$ and/or data indicative of the peak tire rotation rate ration $r_{peak}$) and pressure data to a unique tread depth.

Regardless of how load changes are accounted for over the life of a tire 102, there can still be an overall load dependence due to the vehicle's unloaded weight. That is, different types of vehicle can have different unloaded vehicle weights (i.e., the weight of the vehicle itself), which may cause the sensor to produce different feature values (e.g., acceleration, rotation rate, contact patch angle $\theta_p$, peak tire rotation rate ration $r_{peak}$) even if all vehicles have the same type of tire and have the same amount of extra weight added to the respective vehicles. This variation can be reduced or minimized by, at the time of sensor installation, recording the initial tread depth (e.g., in the system 100). As an example, this process can be automated when sensors are installed in new tires under the assumption that all new tires of a given tire model will have the same initial tread depth upon installation (when installed as a new, previously unused tire). The initial tread depth can be used as a calibration point. That is, upon installation of a new tire 102, the IMU 104 and/or system 100 can determine a contact patch angle of the new tire 102 and a pressure of the new tire 102. Based on the processes and methodologies described herein in combination with the known tread depth and/or pressure of the new tire 102, the IMU 104 and/or system 100 can determine the load on the tire 102 at installation. As an example, a heavy vehicle and a light vehicle can both have a new tire 102 of the same model installed, and either vehicle will produce a different patch angle, which can be used to determine information about the vehicle weight through the determined tire load.

Figure 10:
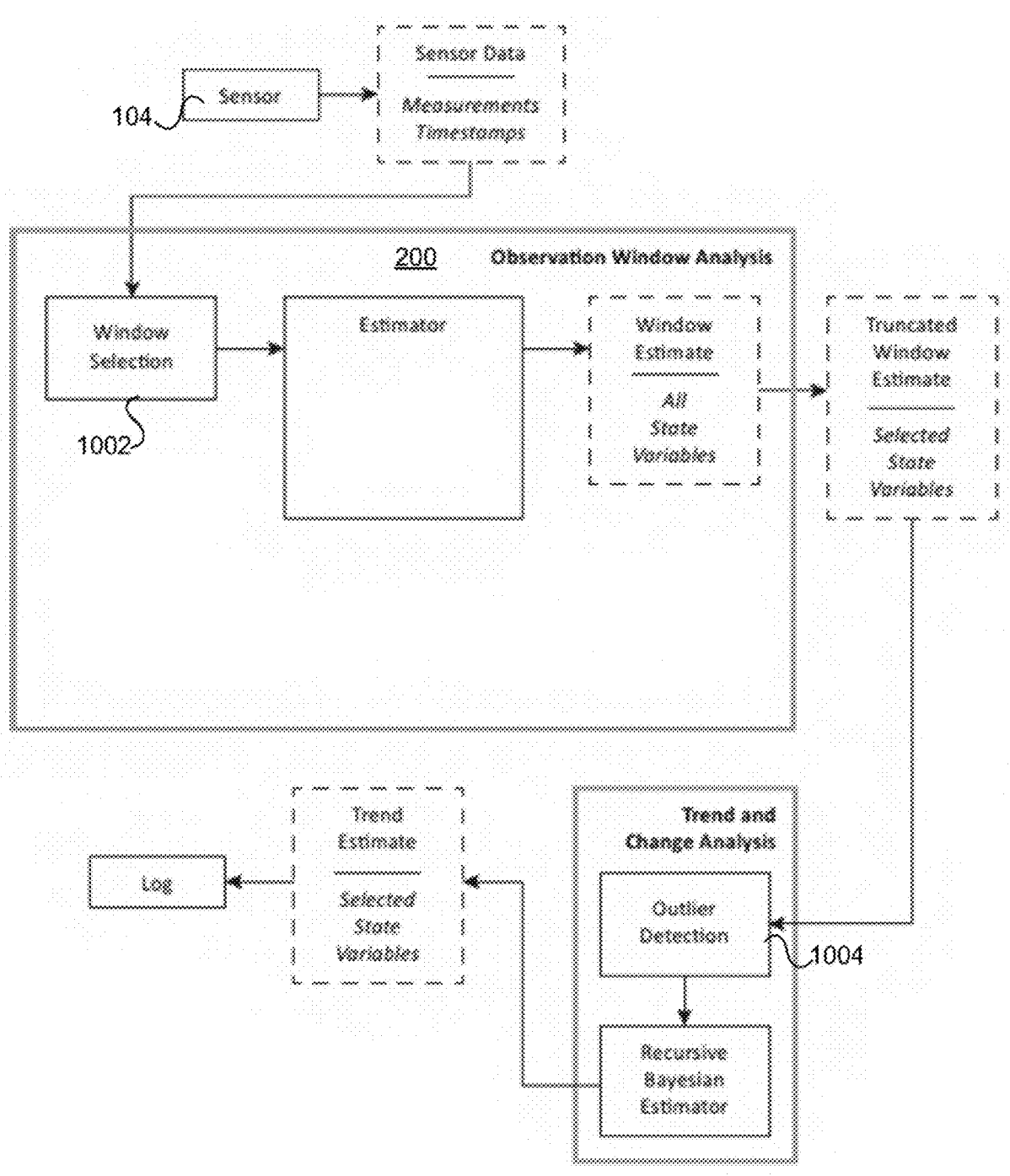
FIG. 10 illustrates a flowchart depicting an example flow of data, according to the disclosed technology.

Referring to FIG. 10, which depicts an example flow of data for the system 100, the system 100 can be configured to transfer data between one or more sensors, the computing device 200, and/or some other device such as a user device (e.g., a mobile device, a vehicle-based device) and/or a server (e.g., a third-party server, a cloud-based host). The one or more sensors (e.g., IMU 104) can detect sensor data and transmit the sensor data to the computing device 200. The sensor as depicted can include an IMU 104, temperature gauge, pressure gauge, piezoelectric flex sensors, or any other sensor, and the sensor data can include one or more of acceleration, rotational velocity, tire flexing intensity, pressure, and temperature. The computing device 200 can be configured to estimate or otherwise determine state variables based at least in part on the sensor data. The state variables can include kinematic variables (angular position, rotation counts) not directly measured or measurable by the one or more sensors, sensor characterization parameters (e.g., biases, sensor alignment angles, rotation counts), and tire properties (including those described above) such as tire alignment angles (e.g., toe and camber), contact patch size, IMU radius, rolling radius, and tread depth.

The computing device 200 can be configured to estimate or determine one or more state variables based on consecutive measurements from the sensor(s) within a predetermined amount of time or a predetermined number of events (e.g., a predetermined number of tire rotations). Each state variable update (e.g., successive sensor data) can correspond to an observation window rather than a single measurement. Successive observation windows can be widely separated in time. This can save power, which is particularly useful if the sensor(s) are battery-powered. Alternately or in addition, this can enable the computing device 200 to select only observation windows (e.g., sensor data corresponding to particular times, positions, or rotation angles) at which it is easier to analyze the tire motion. For example, the computing device 200 can be configured to select only observation windows in which the vehicle is moving slowly but accelerating significantly. As another example, the computing device can be configured to select only observation windows in which the sensor (e.g., IMU 104) is moving through the contact patch 306 and/or the tire 102 is not accelerating (i.e., the tire 102 has an acceleration (e.g., horizontal, angular) that is zero or substantially close to zero).

As depicted in FIG. 10, the box 1002 labeled "Window Selection" can represent the selection of observation windows for further processing, and the computing device 200 can be configured to select one or more observation windows. Observation windows that are selected can be analyzed by the computing device 200, such as for physical state estimation. Various methods for such estimations are discussed herein (e.g., tread depth estimation). The computing device 200 then saves, locally or remotely, the estimated physical state data. The saved physical state data can be subsequently analyzed or processed such as for trend and/or change analysis. The further analysis (e.g., trend and/or change analysis) can be conducted by the computing device 200 and/or some other device (e.g., a remote server). Regardless of which computing device is being utilized, the trend analysis can identify rates of change for slowly varying state variables, especially parameters corresponding to physical quantities of predetermined interest (e.g., wheel and/or tire alignment angles, tread depth). The trend analysis can include performing a lowpass filter to remove measurement noise that survives or is created by the state estimation of the observation window analysis.

The system can include an outlier detection module (e.g., as denoted by box 1004 in FIG. 10, which is labeled "Outlier Detection"), which can discard undesired state updates. For example, these can occur when a state estimation is performed while the vehicle is in a state of motion not well described by the underlying model. For example, the computing device 200 or some other device can be configured to identify relatively sudden changes in state variables that ordinarily change at a slow rate. Alignment values can change suddenly as a result of an encounter with a deep pothole or some other obstacle, for example, but tread depth will not generally change quickly. As explained more fully below, the trend and/or change analysis can include recursive Bayesian estimation steps or other techniques. That is, the trend and/or change analysis can include a distribution of belief over the possible values of each relevant state variables and update this distribution appropriately as new upstream estimates are provided.

Figure 11:
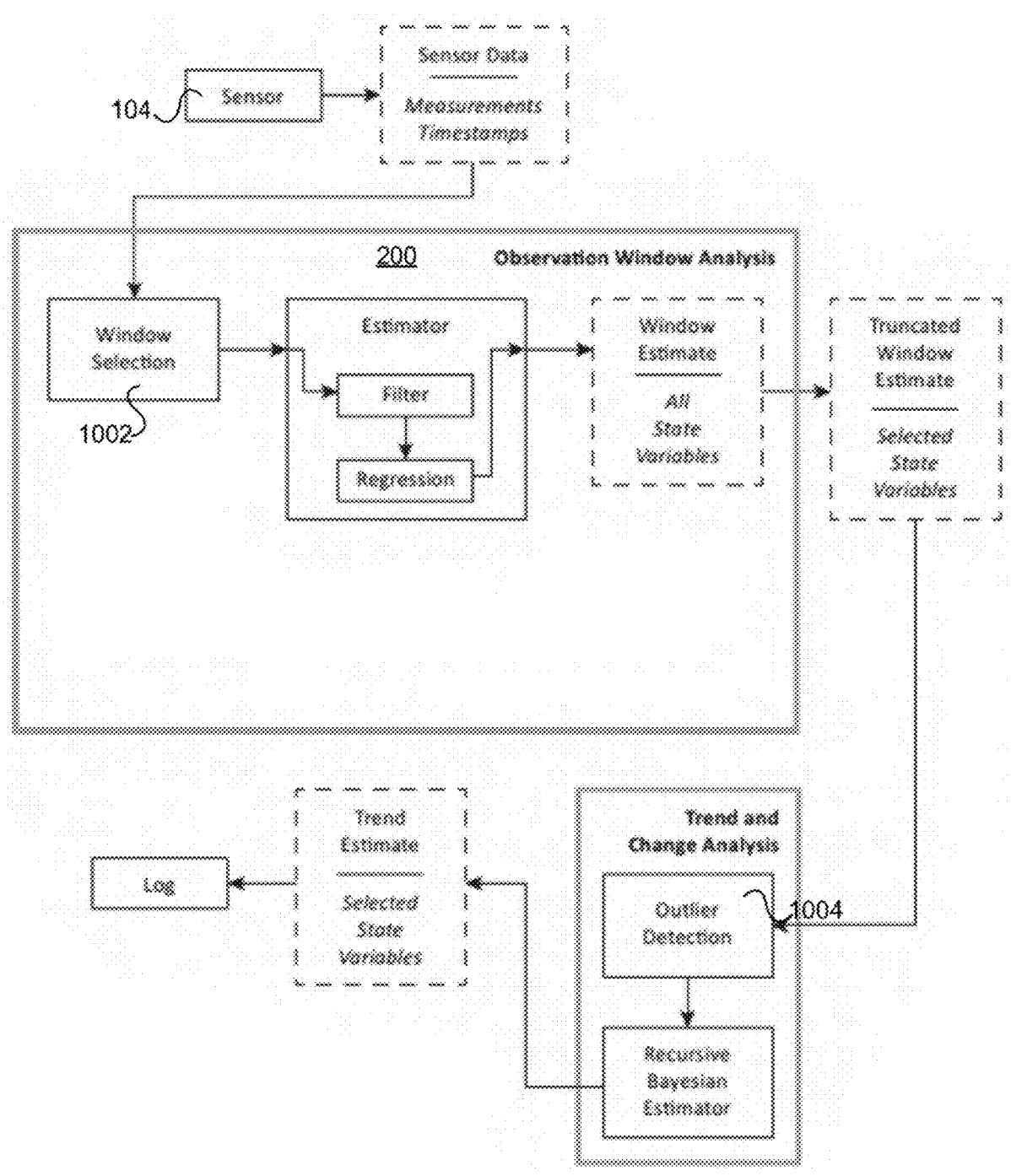
FIG. 11 illustrates a flowchart depicting an example flow of data, according to the disclosed technology.

Referring to FIG. 11, which depicts another example flow of data for the system 100, the computing device 200 or some other device can be configured to perform state variable estimation on an observation window (e.g., sensor data) by, for example, using a combination of lowpass filtering and nonlinear regression. For example, the computing device 200 can generate a lowpass-filtered version of a sensor's (e.g., IMU 104) detected rotational velocity, and the computing device 200 can be configured to generate an angular pose trajectory over the observation window. This trajectory can include several free parameters, such as gyroscope rate biases and gyroscope alignment angles. The computing device 200 can then use a physical model of a rotating sensor to predict the acceleration vector the sensor would output if subject to the generated trajectory. This prediction can introduce additional free parameters, including sensor position coordinates, accelerometer alignment angles, the tire alignment (e.g., toe and camber), the IMU's radius, and the tire's rolling radius. Subsequently, the computing device 200 can be configured to apply a nonlinear regression to fit the predicted acceleration (e.g., based on the behavior modeled in Equations 23 and 24) to the observed acceleration by adjusting the free parameters, such that the parameters that yield the best fit are determined to be the state estimates. The physical rotation model can depend on the sensor's rotational velocity as well as the sensor's derivative and time integral. Lowpass filtering of the rotational velocity signal can be beneficial to prevent excessive noise contamination in the derivative and the integral. A physical rotation model that is ideally suited for circular motion about the wheel axis can be used even if the sensor is affixed to the tire's 102 inner liner provided sensor values used in the regression are restricted to measurements made at times when the sensor is substantially removed from the contact patch 306.

Referring to FIG. 11, the computing device 200 can be configured to apply a separate regression-based estimation for each new observation window (e.g., successive sensor data). That is, the computing device 200 can be configured to ignore in each regression-based estimation any earlier estimates corresponding to previous observation windows. Such a practice can prevent previous data from unduly influencing updated data.

Figure 12:
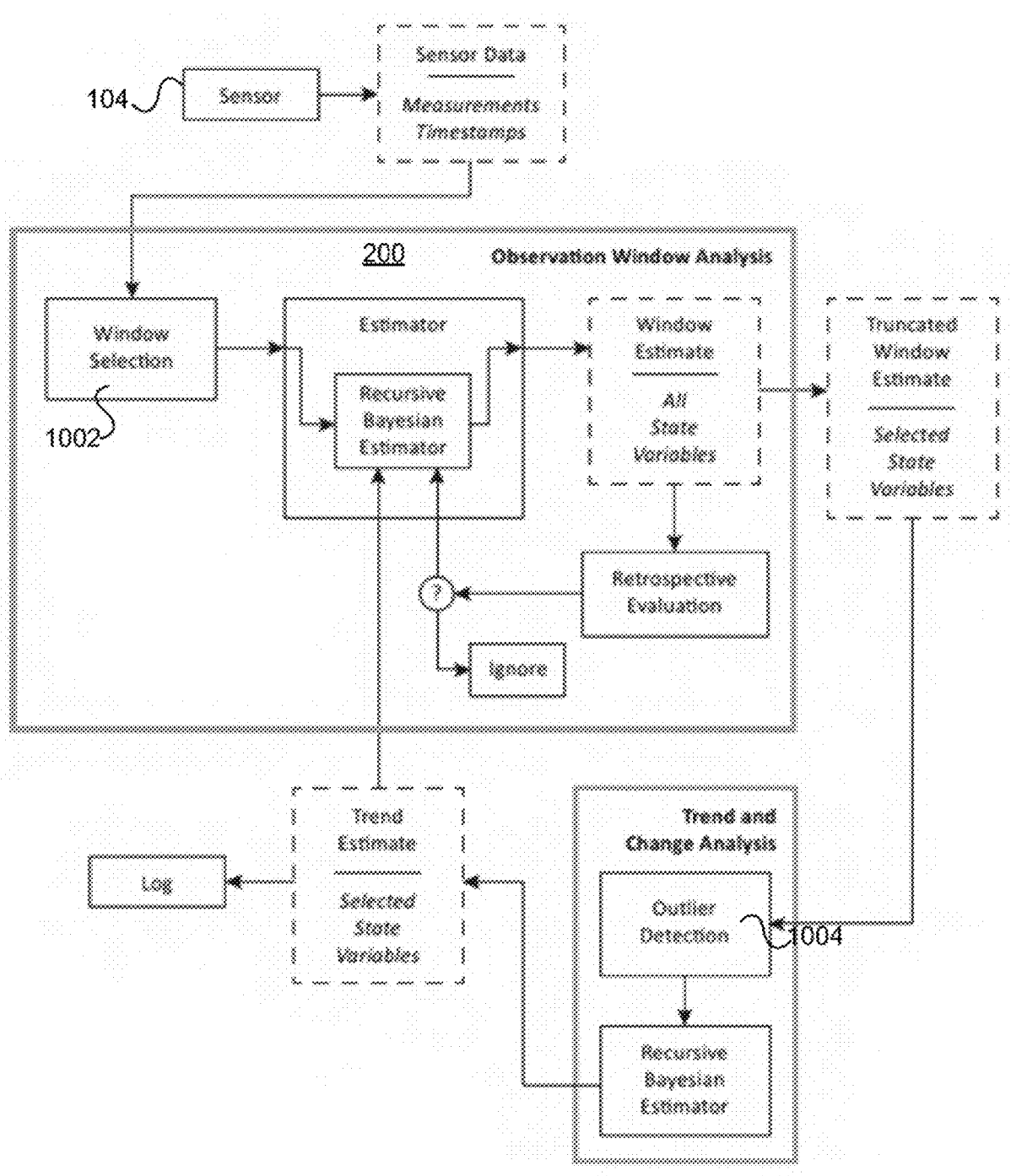
FIG. 12 illustrates a flowchart depicting an example flow of data, according to the disclosed technology.

Alternately, referring to FIG. 12, the computing device 200 can be configured to use earlier estimates to inform newer estimates. For example, once a sharp estimate has been obtained for a slowly changing variable (e.g., the tire's 102 rolling radius), the computing device 200 can be configured to feed the earlier information into subsequent estimations. The computing device 200 can be configured to maintain a distribution over possible state values that describes its current estimation (e.g., "belief") about the sensor's state. For example, for each new sensor measurement, the computing device 200 can be configured to update the estimation distribution by evaluating the conditional probability that the state would have any particular value given the observed measurement and a physical model of the sensor's motion. As an example, when the computing device 200 determines the estimation distribution is above a predetermined level of similarity to a Gaussian distribution, the computing device 200 can be configured to apply a Kalman filter. The feedback of prior estimations (e.g., "beliefs") into the updated estimation process can provide a basis for recursive Bayesian estimation.

In the event the feedback of prior estimations is incorrect and erroneously influences updated estimations (e.g., if the observation window occurs at a time when the vehicle's motion is not well described by the underlying physical model), block 606, which is labeled "Retrospective Evaluation," can represent logic applied by the computing device 200. The Retrospective Evaluation logic can be configured to detect bad updates (e.g., erroneous data) and prevent the bad updates from contaminating the state estimator. As will be appreciated the trend and change analysis can be configured to improve the accuracy of generated state variable estimates, which can improve the accuracy of the state estimator by feeding improved estimates into the state estimator together with its own prior estimations.

While the preceding disclosure has focused largely on determining a tread depth of the tire 102, the system 100 can be configured to provide alternate functionalities. For example, the system 100 can be configured to detect, via the IMU 104 or another sensor, the number of rotations of the tire 102 and/or the actual distance traveled by the tire 102. As another example, the system 100 can be configured to detect, via the IMU 104 or another sensor, the size of the contact patch 306 of the tire 102 as described in more detail above. The size of the contact patch 306 can be indicative of the tire pressure and/or load experienced by the tire 102. For example, a contact patch 306 above a predetermined size can be indicative of a low tire pressure and/or a high load being exerted on the tire 102. Either scenario can increase wear of the tire 102 and may decrease the useful life of the tire 102.

The system 100 can be configured to use the determined size of the contact patch 306 to improve the accuracy of the tread wear calculation. For example, the computing device 200 can be configured to compute a vehicle load based on the determined contact patch 306 size and a pressure measurement of the tire 102. An estimate of the vehicle load, combined with the pressure measurement, can be used to address the dependency of rolling radius on inflation pressure and vehicle load described above.

The system 100 can be configured to more directly determine the load experienced by a tire 102, which can increase the accuracy of the determined size of the contact patch 306, which can in turn increase the accuracy of the determined rolling radius, tread depth, and/or other metrics. The system 100 can include one or more load sensors configured to determine the load experienced at or near one or more tires 102. For example, the system 100 can include a load cell or another sensor configured to measure load, pressure, and/or force. The load sensor can be installed at or near an axle, a vehicle hub, a wheel hub, or any other location on a vehicle that can be useful for determining the load experienced by a tire 102. As a more specific example, one or more load sensors can be located proximate one, some, or all of the wheel hub bolts that attach a wheel to a vehicle, which can provide detailed information regarding the load experienced by the corresponding tire 102. The load sensor can be configured to communicate (e.g., wirelessly) with the system 100.

The system 100 can be configured to determine load indirectly via one or more non-load sensors. For example, the system 100 can be configured to determine, based on data from the IMU 104 (e.g., immediately upon the tire 102 accelerating from a stopped position and/or immediately preceding the tire 102 reaching a stopped position) the size of the contact patch 306, and the system can be configured to determine, based on the contact patch 306 determination and pressure data from a pressure sensor measuring air pressure of the tire 102, an estimated load of the tire 102.

Load measurements and/or determinations can provide an added measure of safety for the commercial trucking industry, for example, as these tire-specific determinations can provide an indication of relative loading. This can in turn enable customized adjustment of tire pressure for specific hauling vehicles and/or specific tires of a given hauling vehicle based on determined load balances and tire placements.

The system 100 can be configured to detect, via the IMU 104, the alignment (e.g., toe and/or camber) of one or more tires on a vehicle. For example, the IMU 104 can be configured to provide a real-time or near real-time determination of a sudden change in camber. If the computing device 200 does determine that the camber and/or toe has undergone a sudden change, the computing device 200 can assume that the alignment of the tire has become misaligned. The system 100 can include an automatic alignment system configured to automatically return a misaligned tire (e.g., a tire with incorrect camber and/or incorrect toe) to an aligned configuration. The automatic alignment system can include one or more actuators attached to the chassis, axle, wheel hub, or another component of the vehicle. The automatic alignment system can be configured to tilt, rotate, and/or shift a wheel to return the tire to an aligned configuration. The amount of tilt, rotation, and/or shift provided by the automatic alignment system can be determined by the severity of misalignment calculated or otherwise detected by the computing device 200. Also, the system 100 can provide dynamic adjustments in alignment to permit different characteristics that the alignment factors provide in different situations.

The system 100 can be configured to provide alerts and tire-health-related information to a user device. As discussed herein, the computing device 200 can serve as a user device. Alternately, the computing device 200 can be included in the system 100, and the computing device can be configured to transmit alerts to a user device (e.g., via a mobile network, the internet, RFID, Bluetooth, or some other communication method or functionality). Regardless, the system 100 can be configured to provide alerts to a user, and the alerts can be indicative of alignment or misalignment of one or more tires (e.g., toe, camber, or caster), inflation pressure (e.g. underinflation) of one or more tires, tread depth of one or more tires, temperature of one or more tires, tire rotation recommendations, tire life (e.g., time installed on vehicle, distance traveled), remaining tire life estimates, tire replacement recommendations, or any other useful information. Possible applications of the aggregated data can include providing alerts to retailers and/or manufactures (e.g., alerts regarding performance, life characteristics, and other factors regarding one or more types of tires), fleet management including maintenance or replacement of tires and/or vehicles of a fleet of vehicles, and providing industry-wide data for industry analysts.

While the disclosed technology has been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

What is claimed is:

1. A tire monitoring system comprising:
a tire sensor mounted within a tire;
a computing device in communication with the tire sensor, the computing device being configured to:
    receive kinematic sensor data from the tire sensor, the kinematic sensor data being indicative of motion of the tire;
    determine a contact patch angle based at least in part on the kinematic sensor data, the contact patch angle being an angle that represents a contact patch associated with the tire, wherein the contact patch angle comprises a difference between a contact patch exit angle and a contact patch entry angle, wherein determining the contact patch entry angle comprises determining an entry angle associated with the kinematic sensor data passing a first kinematic data threshold, and wherein determining the contact patch exit angle comprises determining an exit angle associated with the kinematic sensor data passing a second kinematic data threshold;
    determine a contact patch size based at least in part on the contact patch angle;
    determine a rotation rate of the tire, wherein the rotation rate is based at least in part on dividing a peak angular velocity by a mean angular velocity to calculate a peak tire rotation rate ratio;
    determine an estimated tread depth of the tire based at least in part on the contact patch size and the rotation rate; and
    responsive to determining that the estimated tread depth of the tire is below a tread depth threshold, output instructions to a user device associated with the tire monitoring system, the instructions instructing the user device to provide an indication for one or more suggested actions.

2. The tire monitoring system of claim 1, wherein the tire sensor is attached to an inner liner of the tire.

3. The tire monitoring system of claim 1, wherein the tire sensor is attached to a wheel hub associated with the tire.

4. The tire monitoring system of claim 1, wherein determining the contact patch angle comprises:
determining when the tire sensor enters the contact patch and when the tire sensor exits the contact patch.

5. The tire monitoring system of claim 4, wherein:
determining when the tire sensor enters the contact patch comprises determining a first time or an entry angle associated with the tire sensor; and
determining when the tire sensor exits the contact patch comprises determining a second time or an exit angle associated with the tire sensor.

6. The tire monitoring system of claim 4, wherein determining when the tire sensor exits the contact patch comprises determining a second time or an exit angle associated with the kinematic sensor data passing a second kinematic data threshold.

7. The tire monitoring system of claim 1, wherein the computing device is further configured to:
receive tire data indicative of a model of the tire.

8. The tire monitoring system of claim 1, wherein the one or more suggested actions comprises at least one of instructions to rotate the tire with other tires of a vehicle associated with the tire, instructions to align the tire and the other tires, instructions to inflate the tire, and instructions to replace the tire.

9. The tire monitoring system of claim 1, wherein the computing device is configured to determine the estimated tread depth only during periods in which the contact patch angle remains approximately constant during successive rotations of the tire.

10. The tire monitoring system of claim 1 further comprising a pressure sensor mounted inside the tire and configured to measure a pressure of the tire, the pressure sensor being in communication with the computing device,
wherein the computing device is further configured to:
    receive pressure data from pressure sensor, the pressure data being indicative of the pressure of the tire; and
    determine the estimated tread depth of the tire based at least in part on the contact patch angle and the pressure data.

11. A method comprising:
receiving kinematic sensor data from a tire sensor, the kinematic sensor data being indicative of motion of a tire associated with the tire sensor;
determining, based on the kinematic sensor data, a contact patch size associated with a contact patch of the tire;
determining, based on the kinematic sensor data, a rotation rate of the tire, wherein determining the rotation rate of the tire comprises:
    calculating a peak angular velocity by extracting a plurality of peak angular velocities for each of a plurality rotations of the tire and averaging the plurality of peak angular velocities;
    calculating a mean angular velocity by extracting a plurality of mean angular velocities for each of the plurality rotations of the tire and averaging the plurality of mean angular velocities; and
    calculating a peak tire rotation rate ratio by dividing the peak angular velocity by the mean angular velocity;
determining an estimated tread depth of the tire based at least in part on the contact patch size and the rotation rate; and
responsive to determining that the estimated tread depth of the tire is a below a tread depth threshold, outputting instructions to a user device associated with the tire, the instructions instructing the user device to provide an indication for one or more suggested actions.

12. The method of claim 11, wherein determining the contact patch size comprises determining a contact patch angle that is indicative of an angular distance between entry of the tire sensor into the contact patch and exit of the tire sensor out of the contact patch, the angular distance being with respect to a center of the tire.

13. The method of claim 12 further comprising determining the estimated tread depth only during periods in which the contact patch angle remains approximately constant during successive rotations of the tire.

14. The method of claim 11 further comprising:
receiving pressure data from pressure sensor, the pressure data being indicative of a pressure of the tire; and determining the estimated tread depth of the tire based at least in part on the contact patch size and the pressure data.

15. A non-transitory, computer-readable medium storing instructions that, when executed by one or more processors, causes a system to:

receive kinematic sensor data from a tire sensor, the kinematic sensor data being indicative of motion of a tire associated with the tire sensor;

determine, based on the kinematic sensor data, a rotation rate of the tire, wherein determining the rotation rate of the tire comprises:

calculating a peak angular velocity by extracting a plurality of peak angular velocities for each of a plurality rotations of the tire and averaging the plurality of peak angular velocities;

calculating a mean angular velocity by extracting a plurality of mean angular velocities for each of the plurality rotations of the tire and averaging the plurality of mean angular velocities; and calculating a peak tire rotation rate ratio by dividing the peak angular velocity by the mean angular velocity;

determine an estimated tread depth of the tire based at least in part on the rotation rate; and responsive to determining that the estimated tread depth of the tire is a below a tread depth threshold, output instructions to a user device associated with the tire, the instructions instructing the user device to provide an indication for one or more suggested actions.

16. The non-transitory, computer-readable medium of claim 15, wherein determining a contact patch size comprises determining a contact patch angle based at least in part on when the tire sensor enters the contact patch and when the tire sensor exits the contact patch.

* * * * *